(12) United States Patent
Rygaard et al.

(10) Patent No.: US 11,010,804 B1
(45) Date of Patent: May 18, 2021

(54) SYSTEMS, MANUFACTURES, AND METHODS FOR A COMMERCE PLATFORM COORDINATING TRANSACTIONS WITHIN THIRD PARTY APPLICATIONS

(71) Applicant: Stripe, Inc., San Francisco, CA (US)

(72) Inventors: Rasmus Rygaard, San Francisco, CA (US); Devesh Kumar Senapati, San Francisco, CA (US); Christopher Ross Continanza, Berkeley, CA (US); James William Danz, Los Altos, CA (US)

(73) Assignee: STRIPE, INC., San Francisco, CA (US)

( * ) Notice: Subject to any disclaimer, the term of this patent is extended or adjusted under 35 U.S.C. 154(b) by 9 days.

(21) Appl. No.: 16/518,112

(22) Filed: Jul. 22, 2019

Related U.S. Application Data

(63) Continuation of application No. 15/925,316, filed on Mar. 19, 2018, now Pat. No. 10,380,665, which is a
(Continued)

(51) Int. Cl.
| | | |
|---|---|---|
| *G06Q 30/00* | (2012.01) | |
| *G06Q 30/06* | (2012.01) | |
| *G06Q 20/12* | (2012.01) | |

(52) U.S. Cl.
CPC ..... *G06Q 30/0613* (2013.01); *G06Q 30/0601* (2013.01); *G06Q 30/0627* (2013.01);
(Continued)

(58) Field of Classification Search
CPC .................. G06Q 30/0601–0645; G06Q 30/08
(Continued)

(56) References Cited

U.S. PATENT DOCUMENTS

| | | |
|---|---|---|
| 7,222,087 B1 | 5/2007 | Bezos et al. |
| 7,881,985 B2 | 2/2011 | Hart et al. |

(Continued)

OTHER PUBLICATIONS

Statt, Nick, "Stripe announces Relay, a single way to pay within mobile apps", Sep. 14, 2015, TheVerge.com, accessed at [https://www.theverge.com/2015/9/14/9323735/stripe-announces-relay-single-way-to-pay-within-mobile-apps] (Year: 2015).*
(Continued)

*Primary Examiner* — Jeffrey A. Smith
*Assistant Examiner* — Lindsey B Smith
(74) *Attorney, Agent, or Firm* — Womble Bond Dickinson (US) LLP

(57) ABSTRACT

A method and apparatus for a commerce platform coordinating a purchase of a product sold by a merchant system through a third party application are described. The method may include receiving a notification from the third party application requesting to purchase a product from within the third party application, wherein the notification comprises an identifier for the product and an identifier for the merchant system that sells the product. The method may also include a product checkout interface having an appearance consistent with an appearance of a user interface of the third party application, and transmitting the product checkout interface generated by the commerce platform to a user device executing the third party application causing the third party application to render the product checkout interface within at least a portion of the user interface of the third party application.

23 Claims, 21 Drawing Sheets

Related U.S. Application Data continuation of application No. 15/482,334, filed on Apr. 7, 2017, now Pat. No. 9,940,653.

(52) U.S. Cl.
CPC ..... *G06Q 30/0635* (2013.01); *G06Q 30/0641* (2013.01); *G06Q 30/0643* (2013.01); *G06Q 20/12* (2013.01); *G06Q 30/0615* (2013.01); *G06Q 30/0617* (2013.01); *G06Q 30/0619* (2013.01); *G06Q 30/0621* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,341,036 B2 | 12/2012 | Hartman et al. | |
| 8,606,639 B1 | 12/2013 | Sun et al. | |
| 8,805,573 B2 | 8/2014 | Brunner et al. | |
| 2010/0299212 A1* | 11/2010 | Graylin | G06Q 30/0601 705/14.66 |
| 2014/0279282 A1 | 9/2014 | Begg | |
| 2016/0379213 A1* | 12/2016 | Isaacson | G06F 3/048 705/44 |
| 2017/0046759 A1 | 2/2017 | Chandrasekaran et al. | |

OTHER PUBLICATIONS

Chandrasekaran, Siddarth, "Introducing Relay," <http://stripe.com/blog/relay>, Accessed Aug. 28, 2017, Sep. 14, 2015.

Compton, Jenna, "3 Ways Relay from Stripe will Fundamentally Change the Future," <https://web.archive.org/web/20160314161518/http://bluestout.com/blog/grow-ecommerce-sales-with-relay-for-stripe/>, Accessed Aug. 28, 2017, Oct. 15, 2015.

Kokalitcheva, Kia "How Stripe is letting merchants turn their tweets into storefronts," <http://fortune.com/2015/09/14/stripe-payments-twitter-shopping-tweets/>, Accessed Aug. 28, 2017, Sep. 14, 2015.

* cited by examiner

SYSTEMS, MANUFACTURES, AND METHODS FOR A COMMERCE PLATFORM COORDINATING TRANSACTIONS WITHIN THIRD PARTY APPLICATIONS

RELATED APPLICATIONS

This application is a continuation of U.S. patent application Ser. No. 15/925,316, filed Mar. 19, 2018, which is a continuation of U.S. patent application Ser. No. 15/482,334, filed Apr. 7, 2017. The disclosures of the above applications are incorporated by reference herein in their entirety.

BACKGROUND

Merchants, such as on-line retailers, brick and mortar retailers, service providers, etc., provide their products and services to consumers. One way of providing their products and services includes providing them directly to consumers through, for example, an online store associated with the merchant. That is, a consumer interested in a product sold by a merchant can visit the merchant's website, browse products, and purchase a selected product directly from the merchant.

Another way of providing products and services of merchants to consumers involves using intermediate parties, which offer the merchant products through an outlet of the intermediate parties. For example, a mobile device application provided an intermediate party, such as microblogging, social media, news, etc. application, may offer products of merchants for purchase by the users of the mobile application. In the example above, if a microblogging application were to offer a product of the merchant, the consumer seeking to purchase the product would be re-directed away from the microblogging application to the merchant's separate website. The consumer would then be forced away from the original application to complete the product purchase. The consumer would also be forced to later navigate back to the microblogging application after the transaction with the merchant has been completed.

Such a forced redirection causes several drawbacks to facilitating the purchase of products and/or services of the merchant. By diverting a user of an application away from that application, the user may not return to the application at the conclusion of the transaction. Conversely, a user of the application may avoid continuing with the transaction so that they are not forced to switch applications resulting in reduced transaction conversion due to the required switching of applications. Finally, a user who has been directed to a product or service of a merchant through the application may complete the transaction independent of the application's provider, thereby denying the application provider, which is responsible for initiating the purchase, any remuneration for their efforts.

SUMMARY

The present disclosure is directed to enabling a commerce platform to facilitate transactions for the purchase of products and/or services offered by a merchant within a third party application, substantially as shown in and/or described in connection with at least one of the figures, as set forth more completely in the claims.

In an exemplary embodiment, a commerce platform coordinates a purchase of a product sold by a merchant system through a third party application by storing data indicative of products of the merchant available for purchase through the third party application. In embodiments, products of merchants may be physical items, digital items, services, as well as other items available for purchase from the merchant. Then, in response to a notification from the third party application that a user device executing the third party application has requested to purchase a product from within the third party application, the commerce platform generates a product checkout interface. The interface may be based on an identifier for the product and an identifier for the merchant system that sells the product using the commerce platform received with the notification. The commerce platform transmits the product checkout interface to the third party application to change a user interface of the third party application to include the product checkout interface within the third party application. The product checkout interface is sufficiently similar to the interface of the third party application so that the change from the original user interface to the user interface including the product checkout interface may not be recognized by the user. The purchase of the product from the merchant system is processed by the commerce platform for the user device through a series of product checkout interfaces generated by the commerce platform and transmitted for display within the third party application. The series of product checkout interfaces enable a user of the third party application to configure, within the third party application, characteristics associated with the product being purchased.

In another embodiment, the commerce platform receives the notification in response to user selection of a link to the commerce platform within the third party application. Furthermore, the product checkout interface may be a web page generated by the commerce platform in response to user selection of the link, such that the web page is displayed within at least a portion of the third party application.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
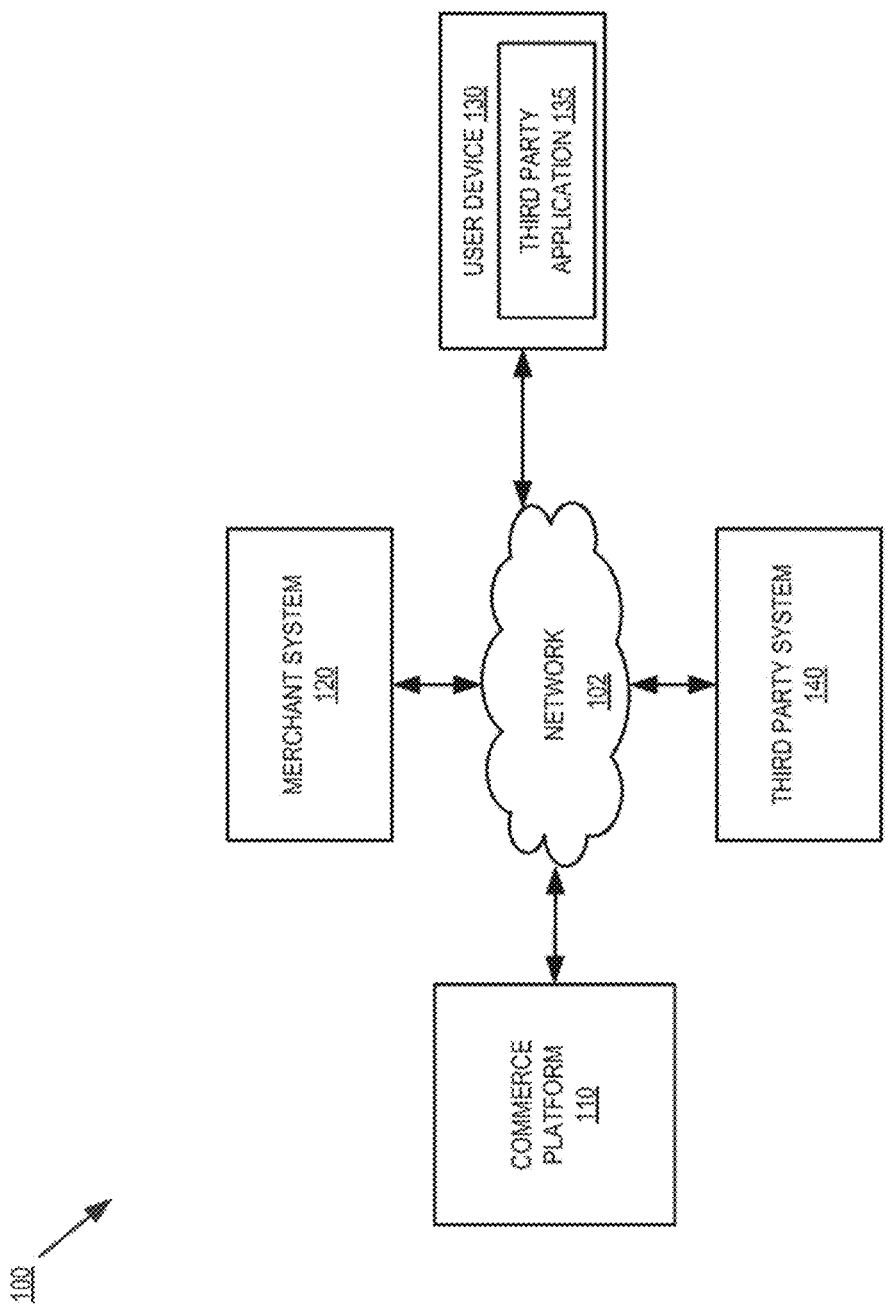
FIG. 1 is a block diagram of an exemplary system architecture for a commerce platform facilitating transactions for purchases from merchants through third party applications.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "transmitting", "processing", "providing", "determining", "accessing", "entering", "utilizing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for a commerce platform facilitating transactions for purchases from merchants through third party applications. In one embodiment, the system 100 includes a user device 130, a merchant system 120, a commerce platform 110, and a third party system 140. In one embodiment, user device 130 is a mobile computing device, such as a smartphone, tablet computer, smartwatch, etc., although in embodiments user device 130 may instead be a desktop computer system, laptop computer system, etc. The merchant system 120, commerce platform 110, and third party system 140 may also be computing devices, such as one or more server computer systems, desktop computer systems, etc.

In embodiments, there may be more than one user device, more than one third party system, and/or more than one merchant system, which may be used with the commerce platform facilitating transactions there between. However, to avoid obscuring the present embodiments, the below discussion refers to the commerce platform 110, merchant system 120, user device 130, and third party application 140.

The user device 130, merchant system 120, commerce platform 110, and third party system 140 may be coupled to a network 102 and communicate with one another using any of the standard protocols for the exchange of information. In one embodiment, one or more of the user device 130, merchant system 120, commerce platform 110, and third party system 140 may run on one Local Area Network (LAN) and may be incorporated into the same physical or logical system, or different physical or logical systems. Alternatively, the user device 130, merchant system 120, commerce platform 110, and third party system 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, user device 130 is responsible for executing third party application 135, which is an application provided by third party system 140. In one embodiment, user device 130 is a mobile device and third party application 135 is a mobile application downloaded to user device from third party system 140, or from a mobile device application marketplace (not shown). User device 130 executes the third party application 135 to access services provided by the third party system. For example, third party application 135 may be a media application, a social media application, a microblogging application, a peer review application, a gaming application, an information application (e.g., news, weather, etc.), or any other mobile application through which a user of user device 130 interacts with the third party system 140. Furthermore, although not illustrated, user device 130 may execute more than one third party application.

In one embodiment, third party system 140 offers the sale of physical products, digital products, services, etc. which are collectively referred to herein as "products," of merchant system 120 within the third party application 135. That is, merchant system 120 is the supplier of the products offered by third party system 140. Furthermore, although merchant system 120 may have its own real or digital marketplaces for offering its products directly to the user of user device 130, in one embodiment, merchant 120 also allows its products to be offered to the user of user device 130 from third party system 140. To this end, both third party system 140 and merchant system 120 interact with commerce platform 110, which facilitates user device transactions originating within third party application 135 for purchase of merchant system 120 products.

In one embodiment, prior to any transaction for products offered by merchant system 120, merchant system 120 establishes a merchant account with commerce platform 110. As discussed in greater detail below, the merchant account may include one or more of identification data of the merchant, information indicative of the location of the merchant, establishment of credentials enabling commerce platform 110 to access product information for all, or a subset, of products offered by merchant system 120 (e.g., stock information, identifiers of individual products, product descriptions, product images, etc.), financial information for completing transactions to purchase products (e.g., accounting information, tax information, shipping information, etc.), remuneration criteria for third party systems 140 indicative of how a third party will be compensated for a sale of a merchant product, as well as any other information that will assist commerce platform 110 in determining what products the merchant system 120 is offering to sell through the third party system 140, and how transactions for the purchase of those products are to be completed.

In one embodiment, prior to any transaction for the purchase of a merchant system 120 product through third party application 135, third party system 140 also establishes a third party system account with the commerce platform 110. Similar to the merchant system account, the third party system account may include one or more of establishing identification data to identify the third party system 140, establishing credentials so that the third party system 140 may securely communicate with the commerce platform 110, etc. Furthermore, in one embodiment, third party system 140 further uploads a logo, an image, a web page link, or other information that includes graphical and/or user interface information representative of the logo and/or branding of the third party system 140 and/or branding in a user interface provided by the third party application 135. As discussed in greater detail below, commerce platform 110 ingests this branding information for use when generating product checkout interfaces that have an appearance (e.g., color scheme, font, logos, etc.) consistent with those of the third party application 135, as discussed in greater detail below.

In embodiments, after the requisite account(s) have been established, commerce platform 110 periodically (e.g., hourly, daily, weekly, etc.) ingests product feeds from merchant system 120. In embodiments, commerce platform 110 can also receive pushed product feeds from the merchant system 120, for example, dynamically and in real time as product stock levels change, as available services become available or unavailable, to reflect changes in product pricing, etc. In embodiments, a combination of periodic and real-time pushed product feeds are ingested by commerce platform 110. As discussed herein, the product feeds are data, such as database records, stock keeping unit (SKU) listings with associated product information, or other records of the products available for purchase from merchant system 120. Third party system 140 may in turn interact with commerce platform 110 and/or merchant system 120 to obtain a product listing of those available merchant products.

In one embodiment, when third party system 140 determines to list or provide information for a product of merchant system 120 within third party application 135, third party system 140 obtains a link to the product (e.g., a link with at least data indicative of the merchant system 120 and the product). In embodiments, however, the link to the product of the merchant is not a link to merchant system 120, but is instead a link to commerce platform 110. In one embodiment, as discussed below, the link is a link to a product checkout interface web page served and hosted by commerce platform 110.

In one embodiment, the link to the product at commerce platform 110 may then be placed within third party application 135. When a user interface element containing the link is selected by a user of user device 130, the link to the product checkout interface web page served by commerce platform 110 is obtained and displayed within at least a portion of the third party application. As noted above, the product checkout interface web page may be generated using the third party system 140 account information (e.g., branding information such as logo, font, color scheme, etc.) to provide a product checkout experience that looks and feels like a user interface of the third party application 135. In embodiments, the product checkout interface web page may be sufficiently similar to the user interface of the third party application such that the introduction of the product checkout interface to at least a portion of the third party application may not be recognized by the user.

In embodiments, the product checkout interface web page is served from the commerce platform 110 to provide an enhanced product checkout experience. This enhanced experience is provided by serving a series of product checkout interface web pages that, for example, enable a user of user device 130 to browse related products, check the stock, size, color, material, or other information for a product, select to purchase a product, enter financial information, and complete a transaction for purchase of a product, which may or may not be the originally linked merchant system 120 product. Each of these interactions, however, is provided by commerce platform 110 generating a new product checkout interface web page in response to the user request. Thus, although the third party application 135 provided the original link to the product, the purchase interactions are performed between the user of user device 130 and the web pages generated, hosted, and served by commerce platform 110. Beneficially, third party application 135 and thus third party system 140 do not handle financial data of the user, and need not be saddled with the requirements and regulations that go along with handling such data. Furthermore, the user's presence is maintained within the third party application 135 before, during, and after the transaction.

In one embodiment, while the transaction details are gathered via the product checkout interface web pages generated by commerce platform 110, commerce platform 110 further interacts with merchant system 120 to complete the transaction. That is, commerce platform 110 ensures that a requested product is still available at merchant system 120, collects user financial information to satisfy the purchase requirements for the product, and verifies the payment information provided by a user. Based on these interactions with third party application 140 and merchant system 120, commerce platform verifies that a product purchase has succeeded and informs the third party application 135 via a confirmation product checkout interface web page. Furthermore, the payment is collected by commerce platform 110 pursuant to the information entered by user. This payment information may then be disbursed to merchant system 120, which then ships the product, provide the service, enable a download, etc., and provides remuneration to the third party system, such as monetary compensation tied to the purchase price of the product.

In embodiments, as discussed above and as will be discussed in greater detail below, the user of user device 130 never leaves the third party application 135 during the purchase of a product. Instead, the user interacts through third party application 135 with branded web pages generated and served by commerce platform to perform product browsing, product selection, product configuration, enter payment information, and complete a transaction, all while remaining within the third party application 135. Furthermore, the third party application 135 need not be limited to providing products of a single merchant system within the third part application, as any number of different merchant system products may be linked (e.g., links to commerce platform 110) within the third party application 135.

Figure 2:
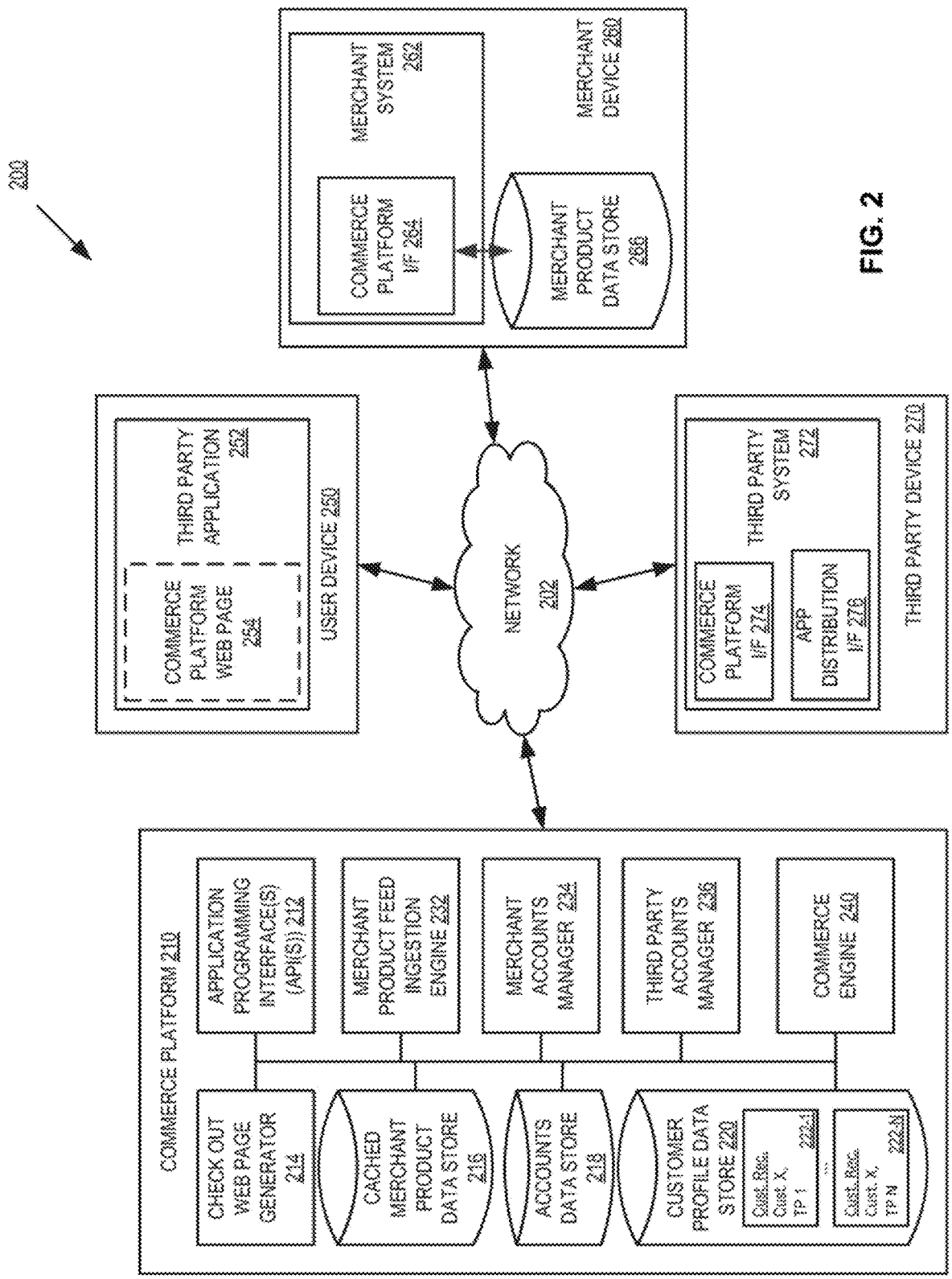
FIG. 2 is a block diagram of one embodiment of a commerce platform, a user device, a third party device, and a merchant device.

FIG. 2 is a block diagram of one embodiment 200 of a commerce platform 210, a user device 250, a merchant device 260, and a third party device 270. Commerce platform 210, user device 250, merchant device 260, and third party device 270 provide additional details for the corresponding devices/systems discussed above in FIG. 1.

In one embodiment, commerce platform includes one or more application programming interface(s) (APIs) 212, a check out web page generator 214, a merchant product feed ingestion engine 232, a merchant accounts manager 234, a third party accounts manager 236, a commerce engine 240, and data stores 216, 218, and 220.

Merchant device 260 includes merchant system 262 having a commerce platform interface 264, which may include one or more APIs, for communicating with merchant accounts manager 234 via commerce platform APIs 212. Similarly, third party device 270 includes a third party system 272 having a commerce platform interface 274, which may also include one or more APIs, for communicating with the third party accounts manager 236 via commerce platform APIs 212. As discussed herein, the merchant system 262 establishes a merchant account with commerce platform 210, which may include one or more of merchant identifier(s), merchant authentication credentials, merchant product purchase requirements (e.g., payment method, shipping regions, etc.), payment/financial information, as well as other merchant system information necessary for the purchase of merchant products, which is stored in accounts data store 218. The third party system also establishes an account with commerce platform 210, including third party system identifiers, third party authentication credentials, third party payout information, third party branding information (e.g., logos, fonts, color scheme, links to user interfaces, etc.), etc., which is maintained in accounts data store 218. In embodiments, the accounts data is maintained in encrypted form to protect the sensitive data stored therein.

In one embodiment, third party device 270 includes third party system 272 having a commerce platform interface 274, which may include one or more APIs, for communicating with commerce platform APIs 212. Third party system 272 of third party device 270 also includes an application distribution interface 276. In one embodiment, user device 250 may obtain the third party application 252 directly from third party system's 272 application distribution interface 276. However, in another embodiment, third party system 272 utilizes the app distribution interface 276 to upload the third party application 252 to a mobile application distribution marketplace (not shown). In either embodiment, user device 250 obtains and executes third party application 252 to access the services provided by third party system 272. As discussed herein, third party application 252 may provide access to microblogging, social media, media, gaming, review, or other services provided by third party system 272.

In one embodiment, along with the services provided by third party system 272 through third party application 252, information for one or more products available for purchase from merchant system 262 may also be provided within the third party application 252. In embodiments, product information for one or more products may be selected for display within the third party application 252 by the third party application 252, dynamically based on current content in the third party application, based on a purchase history associated with a user of the user device 250, based on user preferences accessible to third party application 252, etc.

In one embodiment, however, before such products of merchant system 262 may be offered within third party application 252, merchant product feed ingestion engine 232 communicates with merchant system 262 to obtain product information from merchant product data store 266. In one embodiment, the product information includes information, such as SKUs, stock, product descriptions, shipment options, images, etc. relevant to each product offered by merchant system. In another embodiment, the merchant product feed ingestion engine 232 only obtain this information for a subset of products, such as a group of products that merchant system 262 is wiling to provide for sale through third party application 252. Merchant product feed ingestion engine 232 may ingest products feeds on a periodic basis (e.g., hourly, daily, weekly, etc.), dynamically and in real-time in response to one or more conditions (e.g., high product traffic, a certain number of orders placed, etc.), or a combination thereof. The product feed data indicative of the products, and associated product information, is stored in cached merchant product data store 216.

Third party application 252 may then provide links to one or more products, which have associated information in the cached merchant product data store 215, within the third party application 252. As discussed above, the link to a product offered by merchant system 262 is a link to a product checkout user interface web page provided by commerce platform 210. The link includes information sufficient to generate the product checkout user interface, which may include data identifying the merchant, the product, the third party system, as well as other information.

Then, upon user selection of a product link within third party application 252, which is received by commerce platform 210, check out web page generator 214 generates a checkout user interface web page based on the third party identification data, the merchant identification data, and the product identification data. That is, the product identification data identifies a product within cached merchant product data store 216, the third party identification data identifies branding information within accounts data store 218 to generate a "white label" styled checkout user interface, and the merchant identification data is utilized to enable browsing of other products, sizes, colors, and options during a product checkout experience. In embodiments, the product identification data may also be used to locate similar products offered by different merchants, and enable browsing of similar products offered by the different merchants.

The commerce platform web page 254 is then provided to third party application 252, which displays the commerce platform web page 254 within a portion of the user interface of the third party application 252. A user of the third party application 252 may then browse through a series of product checkout web pages, such as product selection, product configuration, entering payment information, etc., which are each generated by checkout web page generator 214.

A commerce engine 240 of commerce platform 210 utilizes received payment information to collect payment from a user of third party application 252 interacting with commerce platform via commerce platform web page 254. Once payment is received by commerce engine 240, the product order can be completed, including confirming the successful completion to a user via web page generator 214 and web page 254 displayed within third party application 252. Furthermore, payment and notice is sent to merchant system 262 to complete the order (e.g., package and ship) and update merchant product data store 266 accordingly (e.g., update stock). Additionally, third party system 272 may also receive payment for the competed purchase.

In one embodiment, the checkout user interface web page(s) generated by commerce platform 210 further enable a user of third party application to save their account details, such as saving a name, contact information, shipping information, payment information, etc. that is to be later used as a customer profile of the user during a subsequent transaction. Since the transaction occurs through third party application 252 associated with third party system 272, any customer profile data is maintained in a per-third party system customer record (e.g. customer records 222-1 through 222-N) of customer profile data store 220. For example, customer Jane Doe may purchase a product through Third Party A from Merchant X. When Jane Doe later attempts to purchase a product through Third Party A from Merchant Y, Jane Doe's customer profile information may be used in the later transaction to, for example, auto fill contact fields, financial information, etc. in web pages generated by commerce platform 210. However, even when Jane Doe's customer profile information is available within customer profile data store 220, it will not be used by commerce platform 210 when a purchase is made through Third Party B, even if the purchase is for a product of Merchant X or Merchant Y. In other words, even though commerce platform 210 has customer/user profile information available, the information is not shared across different third party applications.

Figure 3:
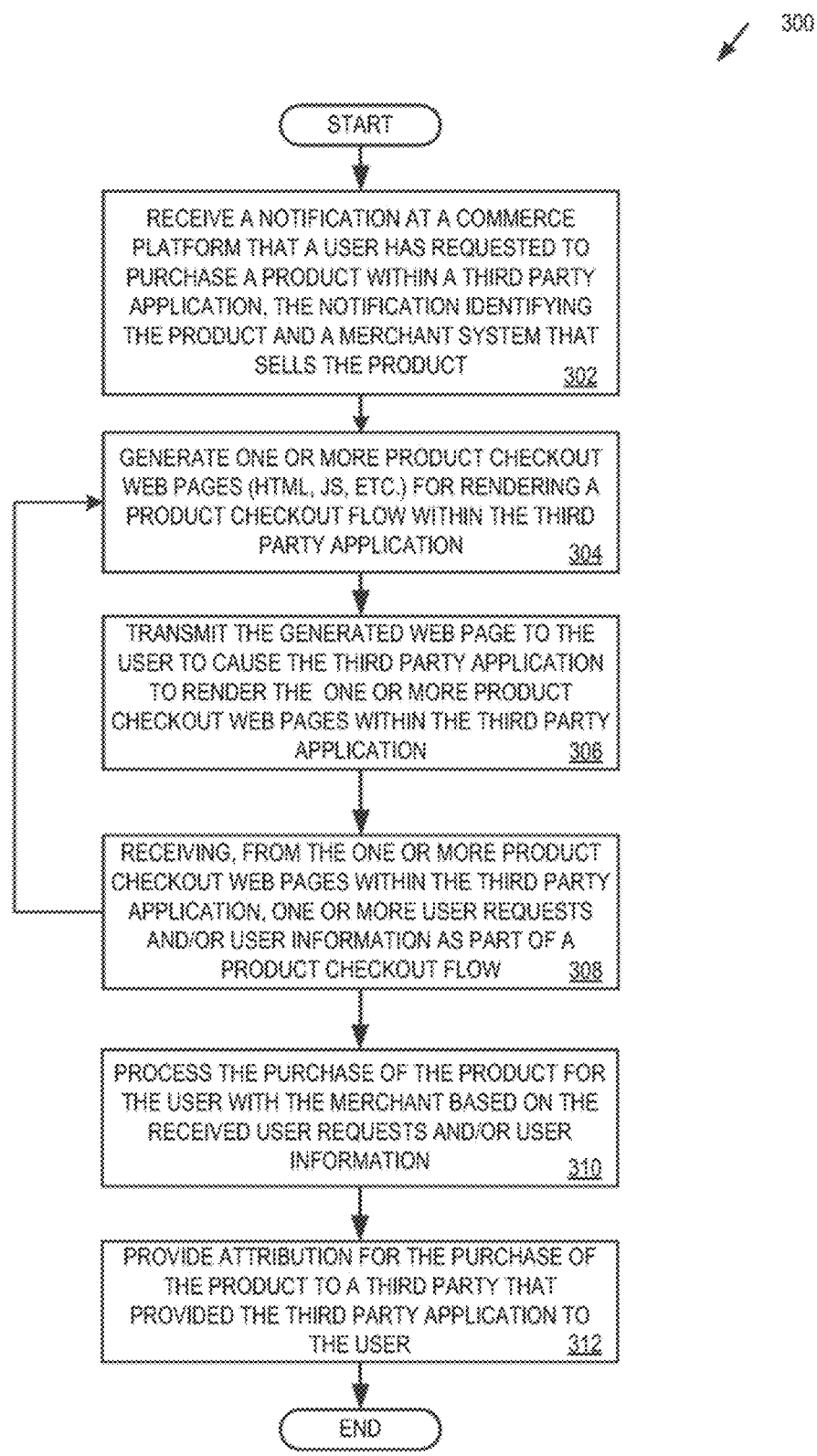
FIG. 3 is a flow diagram of one embodiment of a method for facilitating transactions for purchases from merchants through third party applications.

FIG. 3 is a flow diagram of one embodiment of a method for facilitating transactions for purchases from merchants through third party applications. The method 300 is performed by processing logic that may comprise hardware (circuitry, dedicated logic, etc.), software (such as is run on a general purpose computer system or a dedicated machine), firmware, or a combination thereof. In one embodiment, the method 300 is performed by a commerce platform (e.g., commerce platform 110 or 210).

Referring to FIG. 3, processing logic begins by receiving a notification at a commerce platform that a user has requested to purchase a product within a third party application, the notification identifying the product and a merchant system that sells the product (processing block 302). As discussed herein, in embodiments, the notification may include user selection of a link to the product displayed within the third party application. The link, in embodiments, may include data identifying the merchant, the product, the third party system, as well as other information. For example, a third party fashion application may display different dresses, and each dress may be linked to the commerce platform, as disused herein.

Processing logic generates one or more product checkout web pages, such as HTML, JS, etc. web pages, for rendering a product checkout flow within the third party application (processing block 304). The product checkout flow includes a series of web pages that provide product browsing, product selection, product configuration, payment information gathering, and payment processing interfaces. However, processing logic of the commerce platform transmits a generated web page to the user to cause the third party application to render the one or more product checkout web pages within the third party application (processing block 306). Thus, the user does not leave the third party application to order a product. Furthermore, the generated web pages may be customized for each third party so that the checkout experience appears to be part of the third party application, even though the user is interacting directly with the commerce platform during the product checkout process.

Processing logic receives, from the one or more product checkout web pages within the third party application, one or more user requests and/or user information as part of a product checkout flow (processing block 308). For example, a user may select to view a different product, which causes processing block 304 to generate a new product checkout user interface web page for that product. As another example, a user could select a size of a garment being purchased, which causes processing block 304 to generate an updated product checkout user interface web page that reflects the stock of the garment in the selected size.

In one embodiment, after purchase request and payment information may be received from a user in a product checkout user interface page, processing logic would then proceed to processing block 310 to process the purchase of the product for the user with the merchant based on the received user requests and/or user information (processing block 310). As discussed herein, in one embodiment, the user may enter their payment information. However, in another embodiment, a returning user who purchases a product through the same third party application may use saved customer profile information to complete purchase details. In this embodiment, one or more product checkout user interface web page(s) may have customer profile data pre-filled in relevant fields of the product checkout user interface web page(s).

Once the purchase has been processed, such as verifying payment, verifying stock of a product with a merchant, verifying the merchant has accepted an order, etc., processing logic provides attribution for the purchase of the product to a third party that provided the third party application to the user (processing block 312). That is, the third party system that originated the product purchase receives remuneration in the form of a payout, which can be based on the purchase price associated with the transaction.

Figure 4:
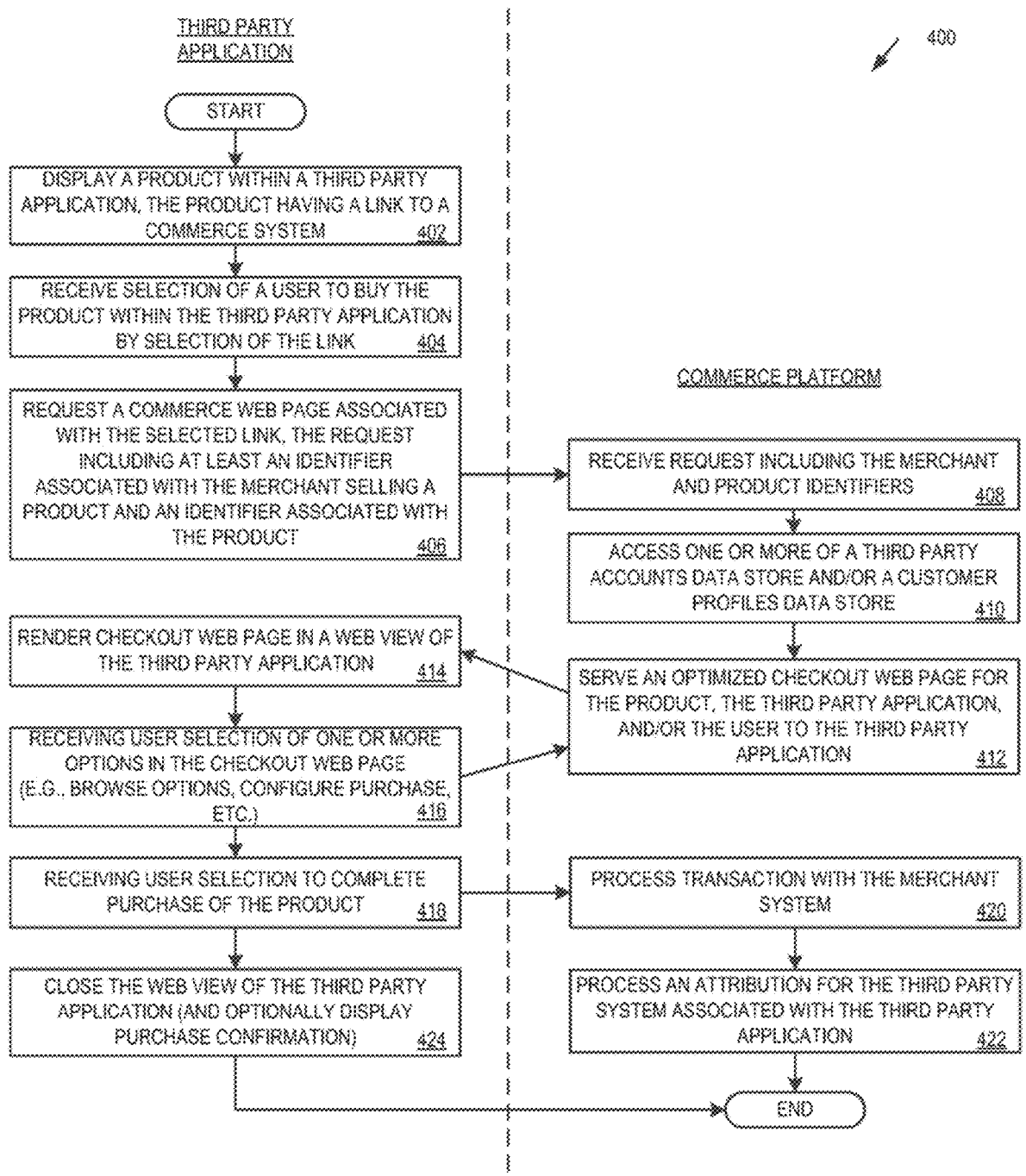
FIG. 4 is a flow diagram of one embodiment of a method for a third party application interacting with a commerce platform that facilitates transactions for purchases from merchants through the third party application.

FIG. 4 is a flow diagram of one embodiment of a method for a third party application interacting with a commerce platform that facilitates transactions for purchases from merchants through the third party application. The method 400 is performed by processing logic that may comprise hardware (circuitry, dedicated logic, etc.), software (such as is run on a general purpose computer system or a dedicated machine), firmware, or a combination thereof. In one embodiment, the method 400 is performed by a commerce platform (e.g., commerce platform 110 or 210) interacting with a third party application (e.g., third party application 135 or 252), which is further illustrated with reference to the exemplary product checkout user interface web pages of FIGS. 9-16E.

Figure 9:
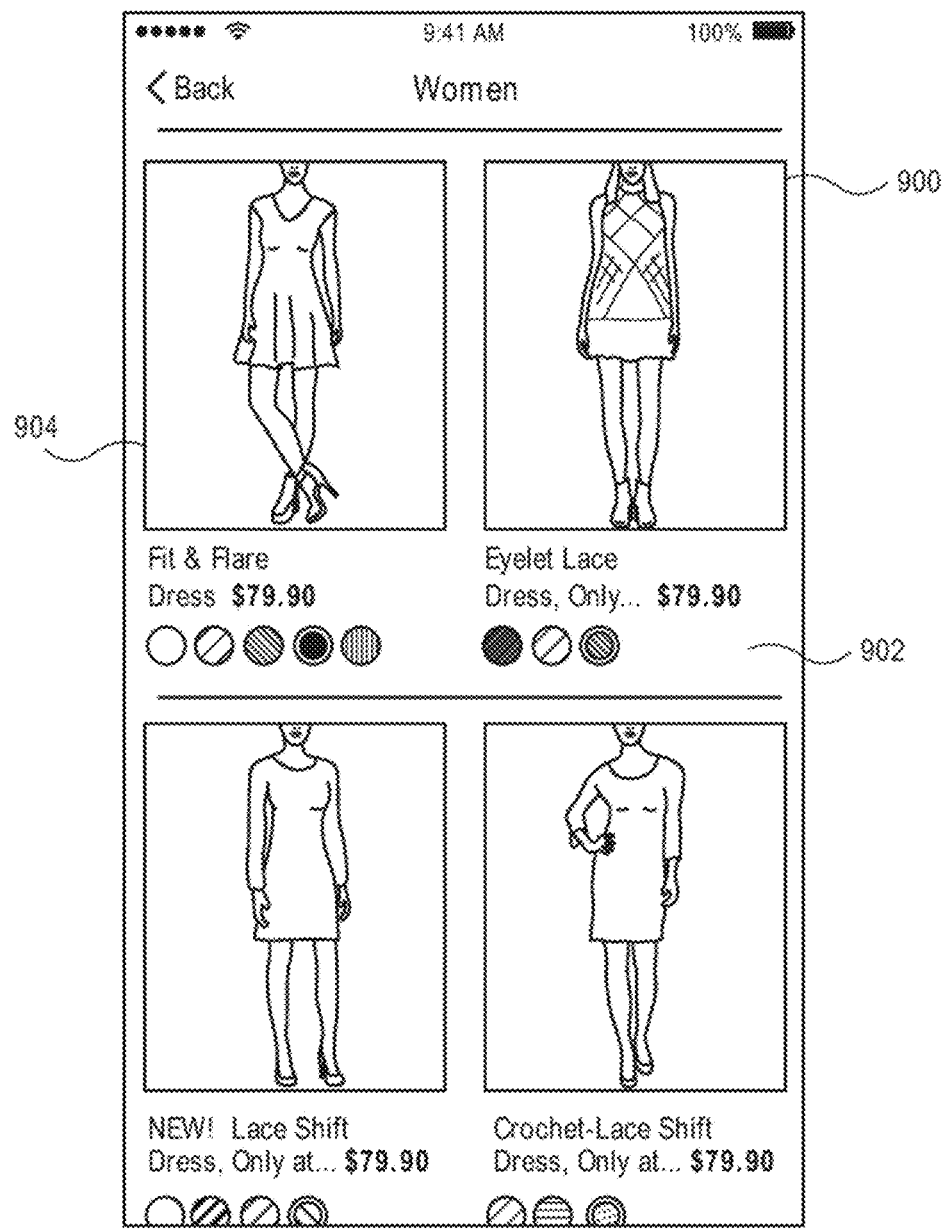
FIGS. 9-16E illustrate graphical user interfaces that, in embodiments, are generated by a commerce platform during the facilitation of a transaction for purchase of a merchant product within a third party application.
Figure 10:
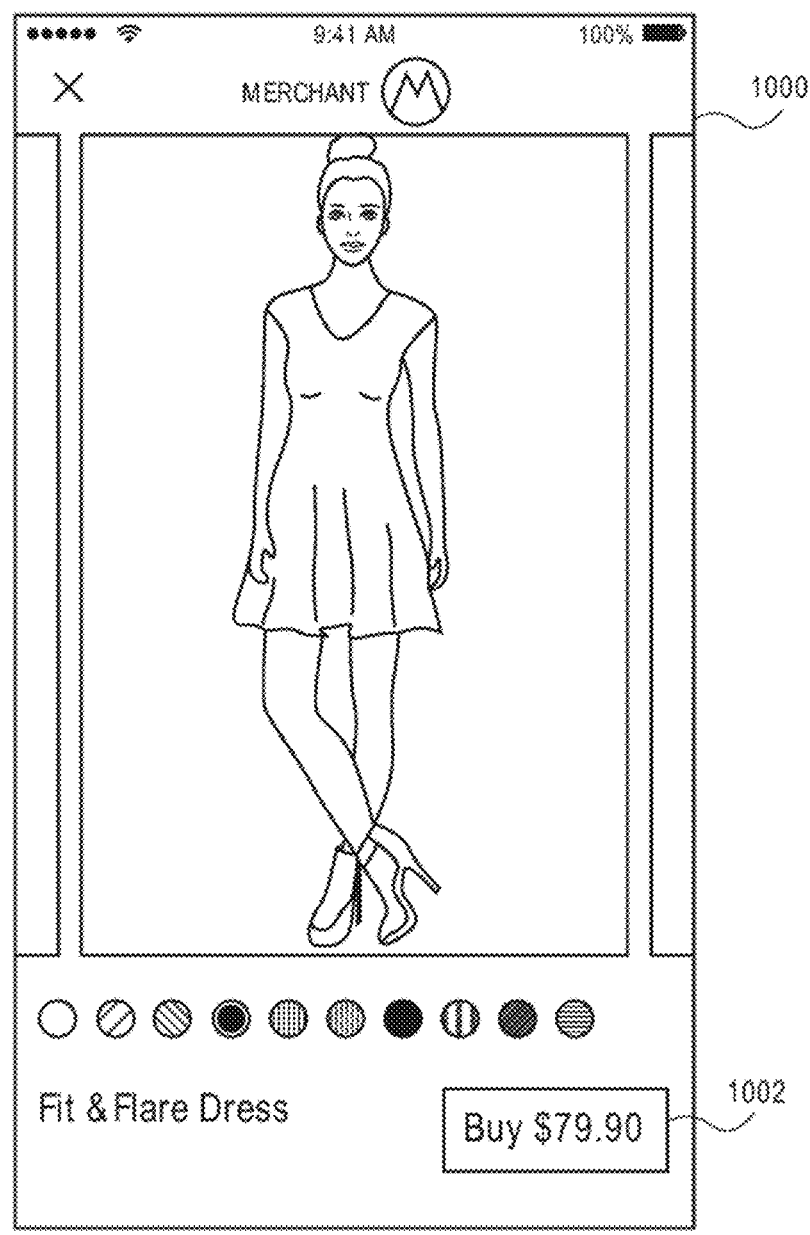

Referring to FIG. 4, processing logic begins by the third party application displaying a product within a third party application, the product having a link to a commerce platform (processing block 402). An example of a user interface 902 displaying clothing 904 within a third party application 900 is illustrated in FIG. 9. Processing logic receives user selection of an item, such as a selection to buy the item, within the third party application (processing block 404). FIG. 10 illustrates a user interface 1000 displayed within the third party application of a selected object (e.g., object 904 of FIG. 9), and a link 1002 to buy the selected object.

As discussed herein, the link is a web page link to the commerce platform, and in response to user selection of the link, processing logic requests a commerce web page associated with the selected link, the request including at least an identifier associated with the merchant selling the product and an identifier associated with the product (processing block 406). Other identifiers, such as an identifier of the third party application, which enables generating specially configured user interfaces, and an identifier of a user of the third party application user, which may enable access to customer profile data, may also be encoded in the link and/or link selection.

Figure 11:
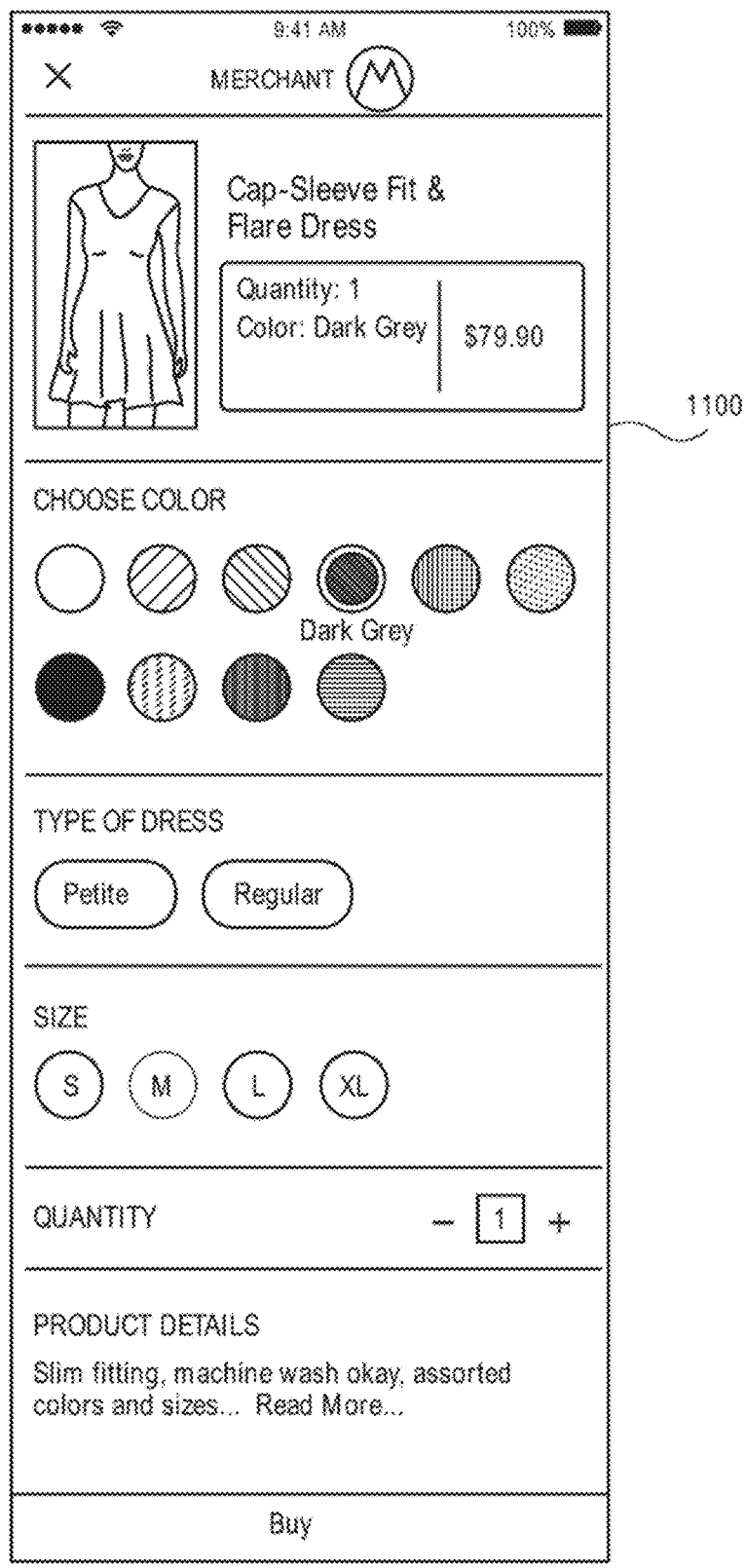

Processing logic of the commerce platform receives the request including the identifiers (processing block 408), accesses one or more of a third party accounts data store and/or a customer profiles data store (processing block 410), and serves an optimized checkout web page for the product, third party application, and/or user to the third party application (processing block 412). The optimized checkout web page, as discussed herein, is configured using third party system branding information so that the web page has a consistent look with the existing user interface of the third party application. For example, FIG. 11 illustrates a generated product checkout web page 1100 displayed within a third party application, which has a consistent appearance to the third party application interface illustrated in FIG. 9.

Figure 12:
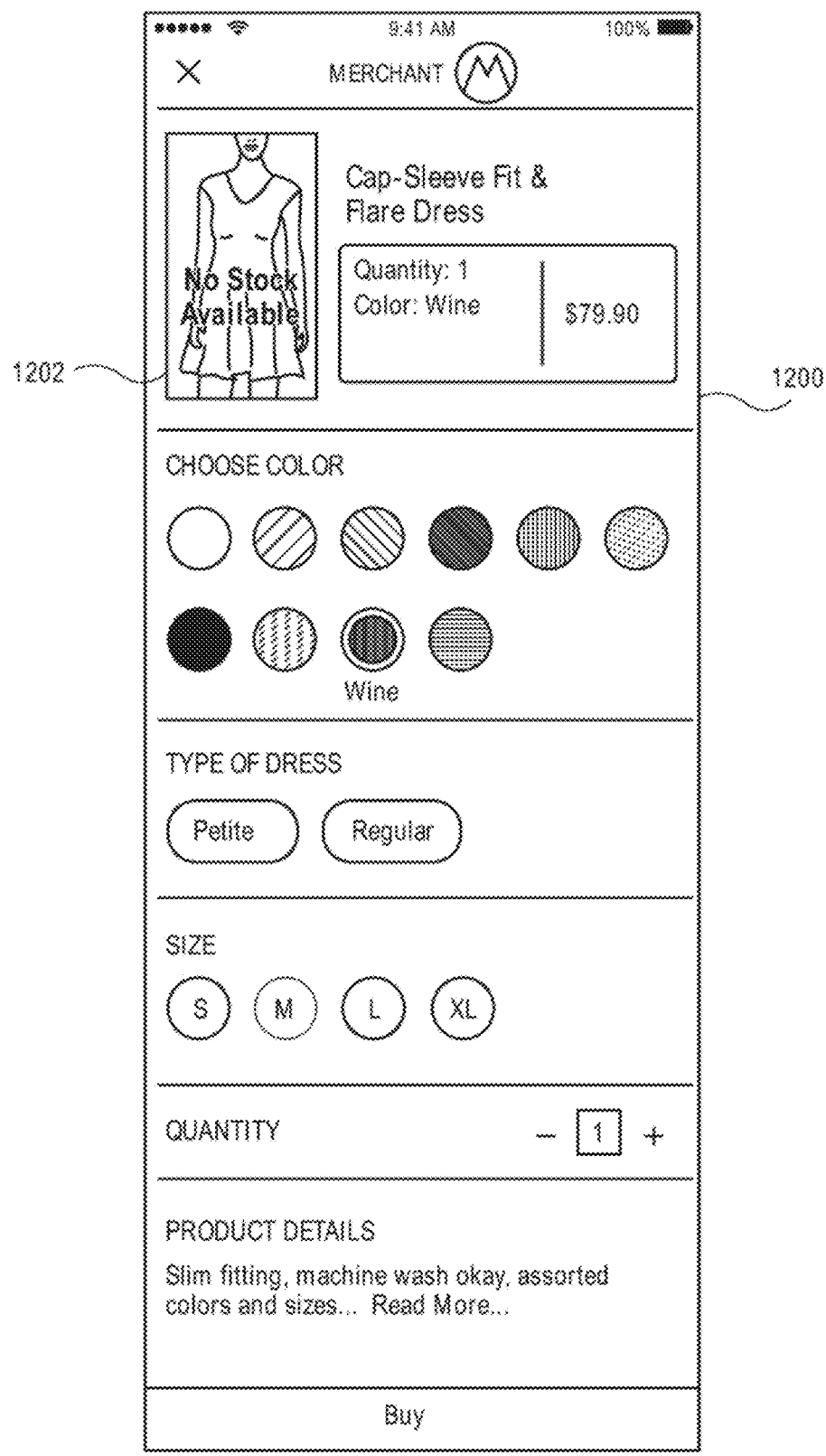
Figure 13A:
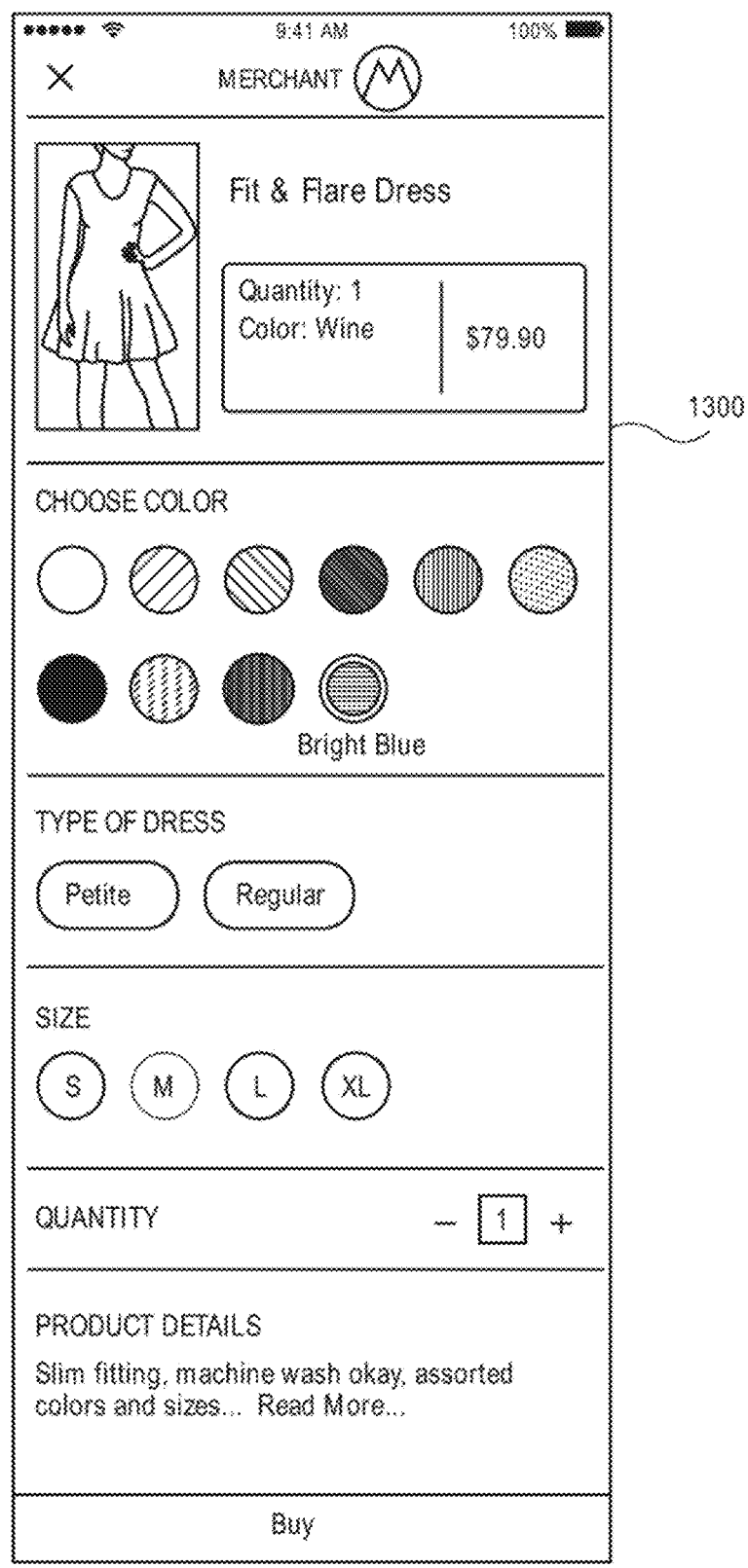
Figure 13B:
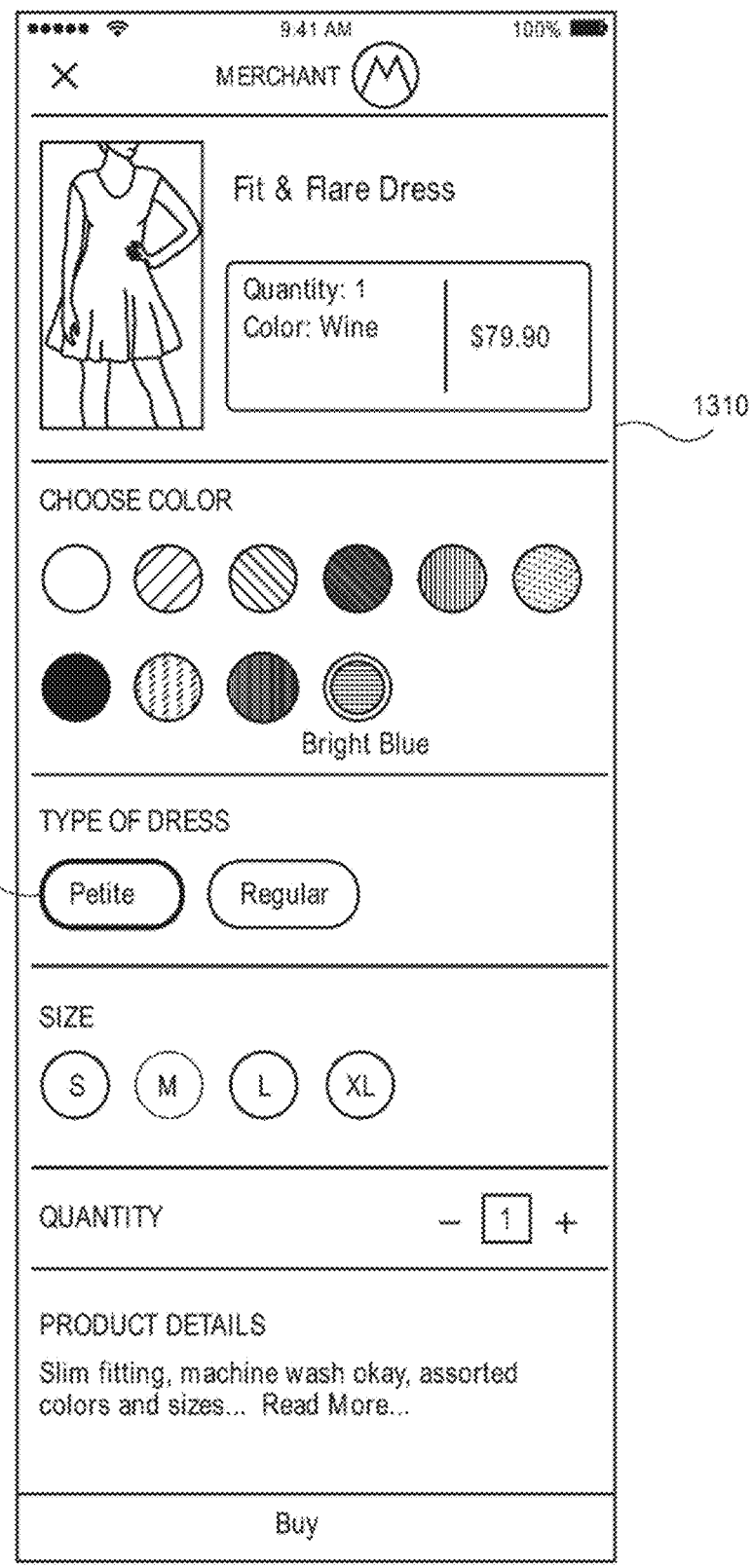
Figure 13C:
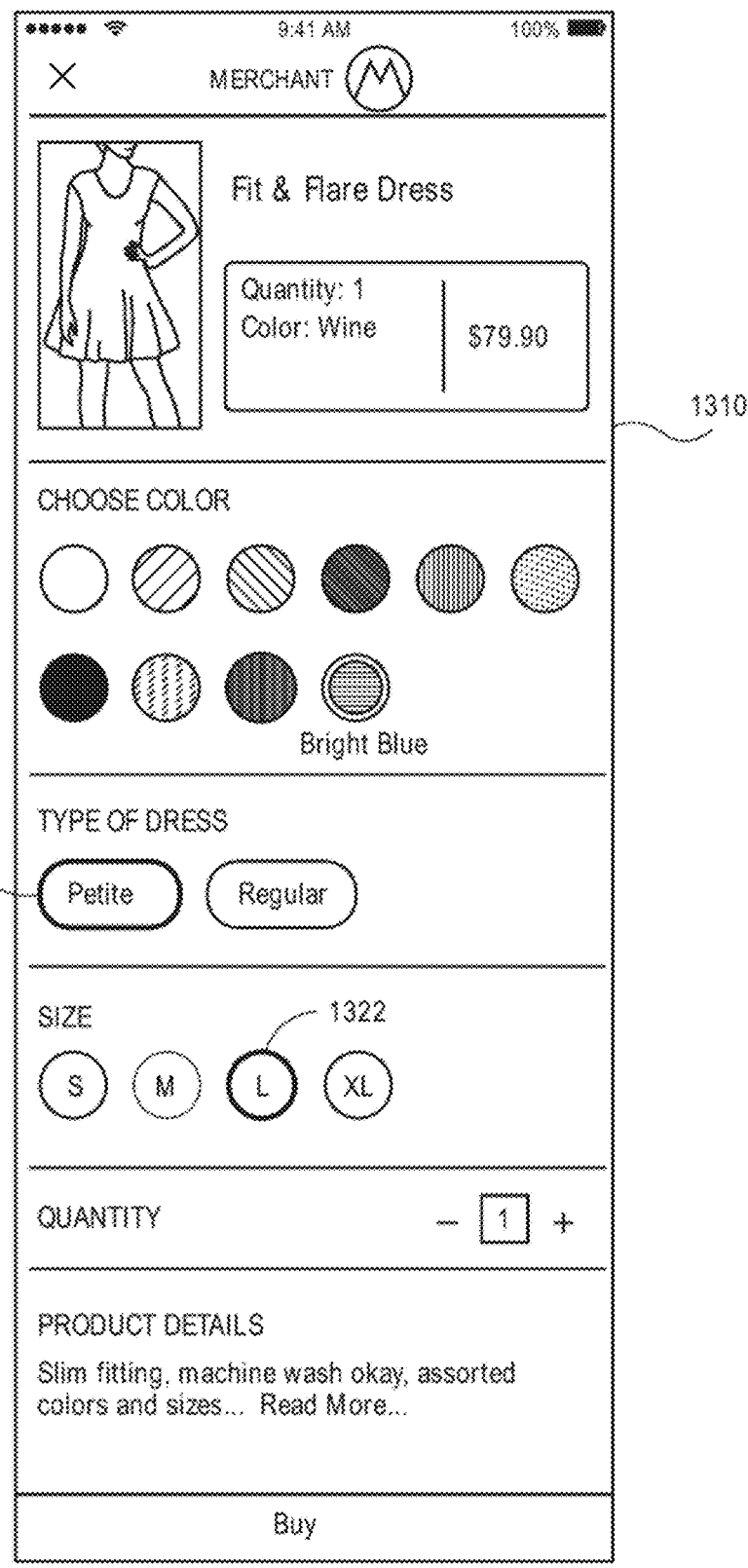
Figure 14:
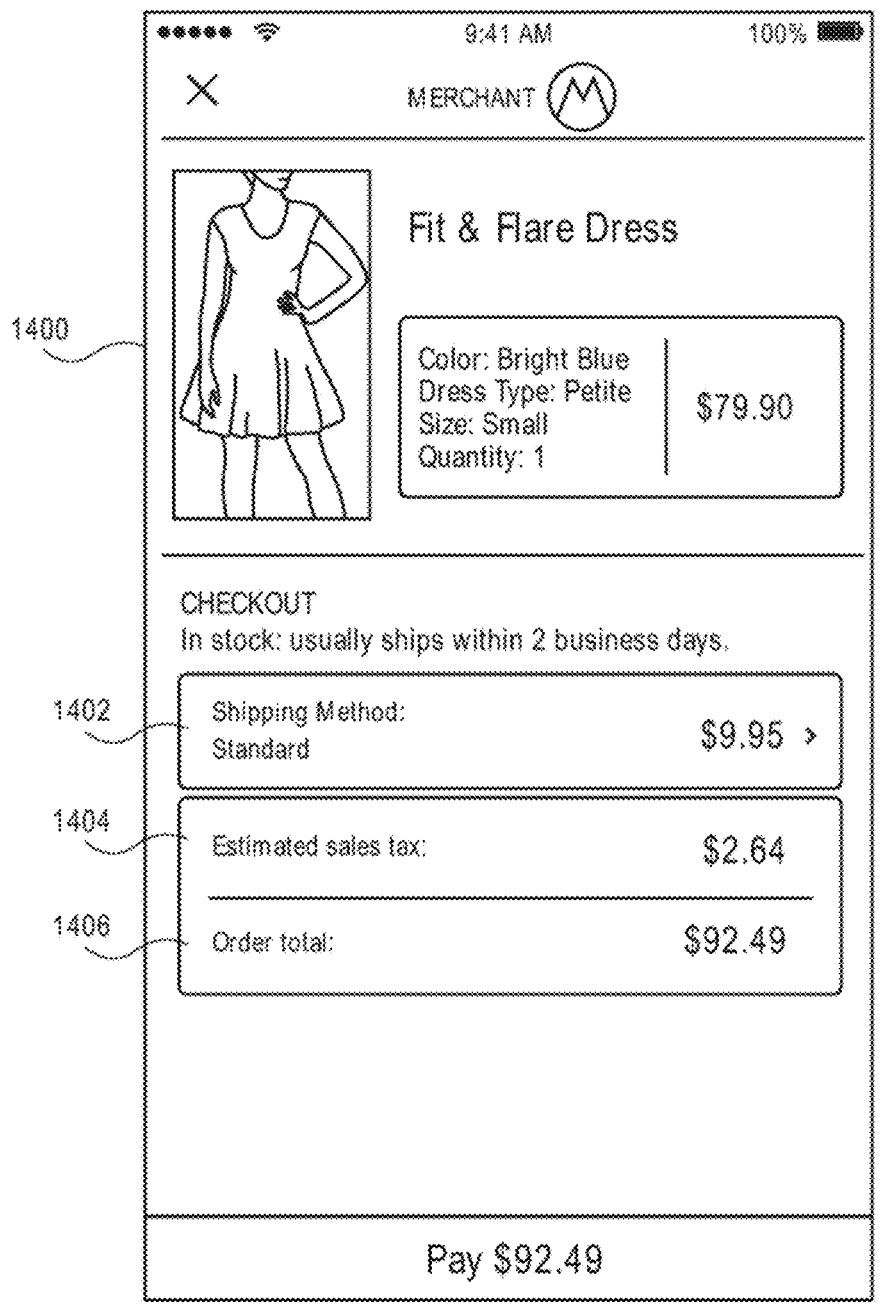
Figure 15:
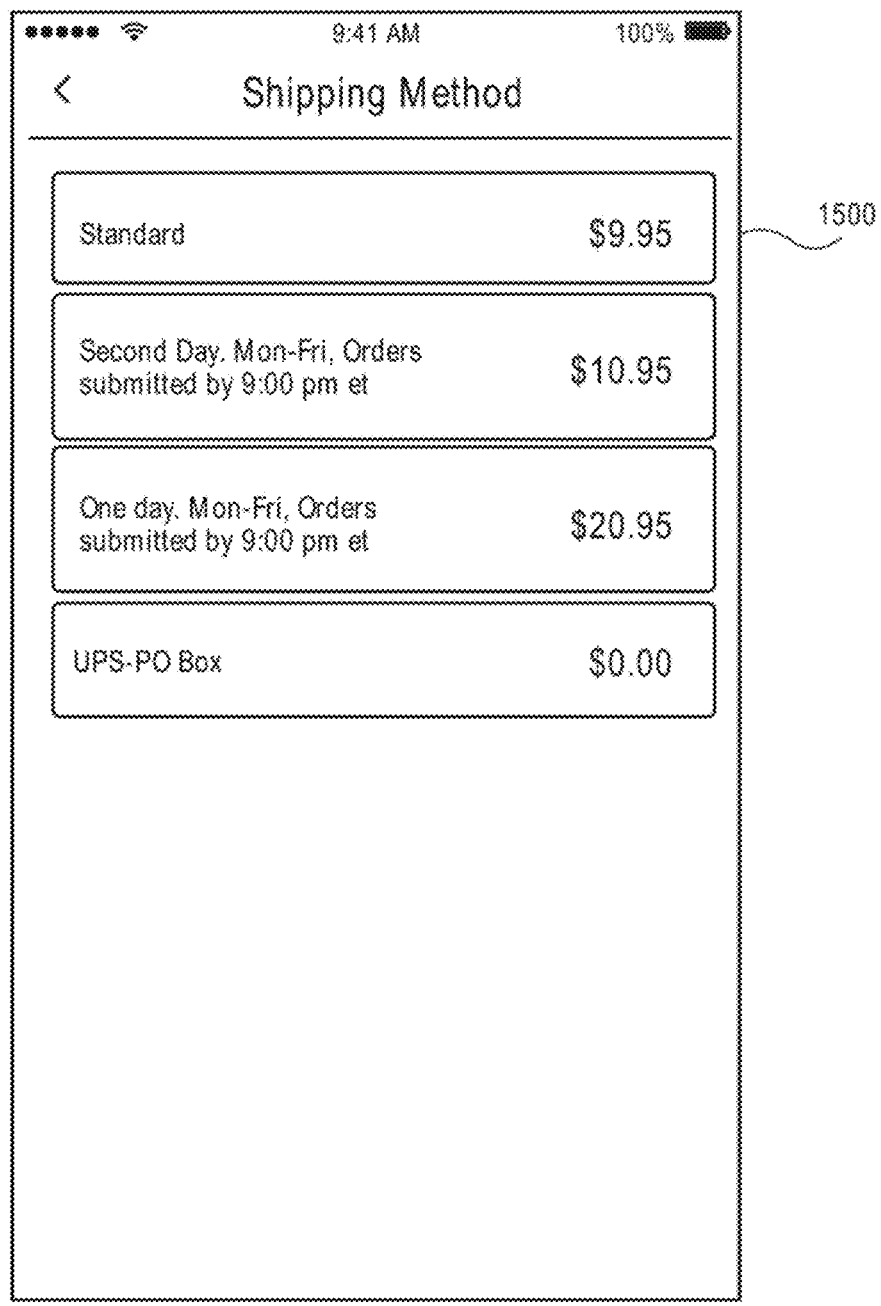
Figure 16A:
Figure 16B:
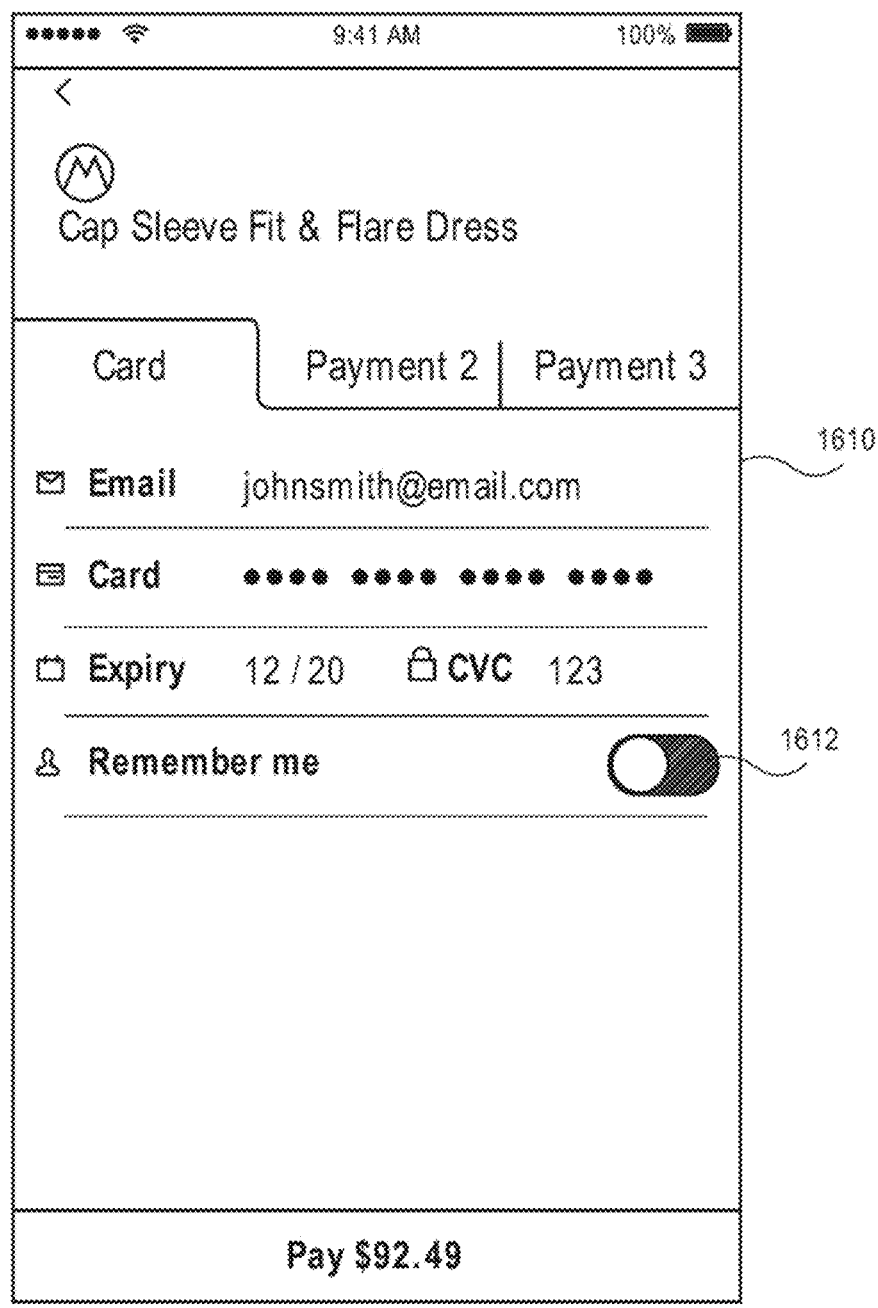
Figure 16C:
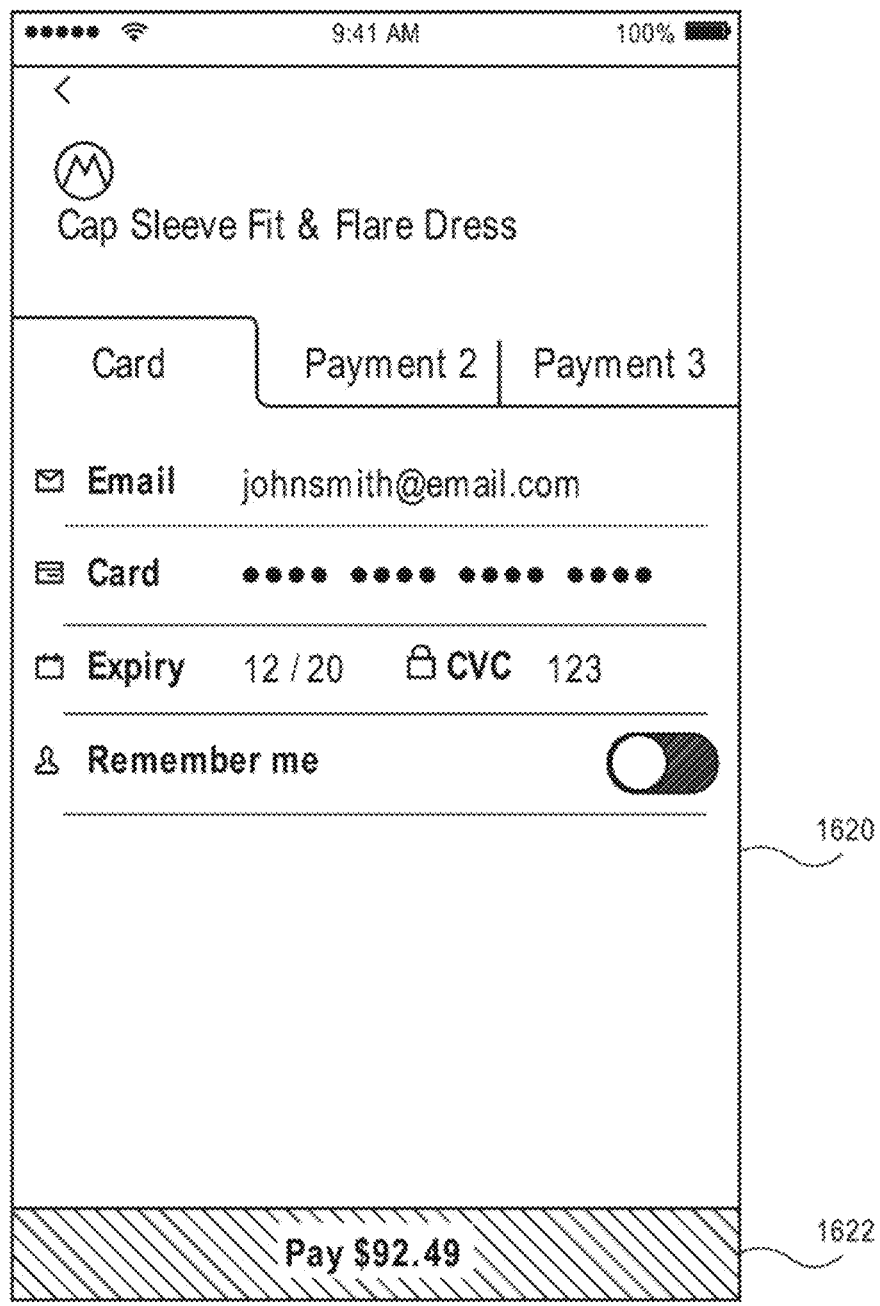
Figure 16D:
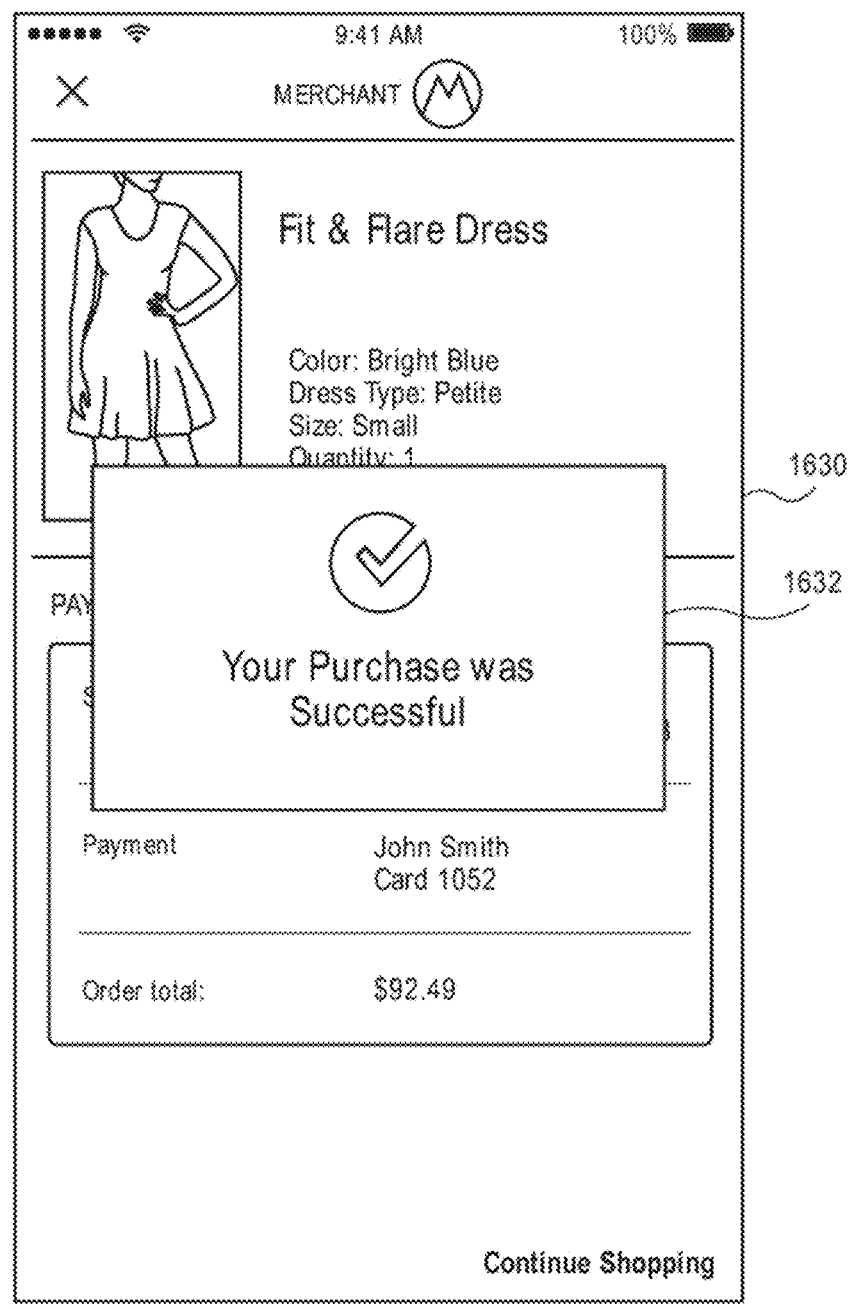
Figure 16E:
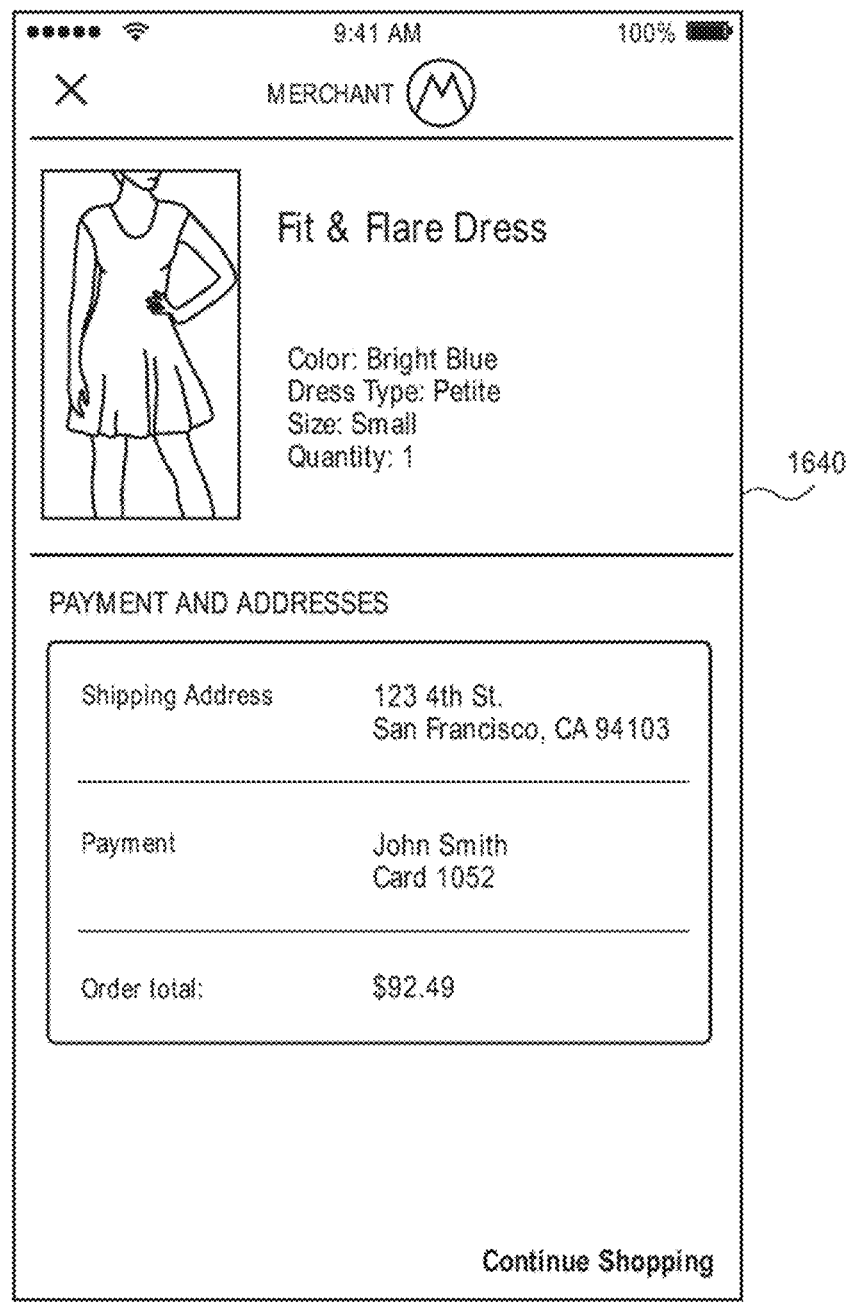

The checkout web page is rendered in a web view of the third party application (processing block 414), and user selection of one or more options within the web page, such as product browsing options, product configuration options, product purchase options, are received (processing block 416). This data, which may include link selections, data entry, etc. are received by commerce platform at processing block 412, which generates and serves an updated web page, a next product checkout web page in a series of a product checkout flow, etc. Furthermore, the content of these web pages may be driven by cached product feed data (e.g., obtained data about available products), as well as based on inquiries and responses to a merchant system. FIG. 12 illustrates a subsequent web page 1200, generated by commerce platform, providing a stock status 1202 for a selected product configured within the third party application. Then, FIGS. 13A-13C illustrate further web pages generated by commerce platform and displayed within third party application corresponding to configuration of a product for purchase. FIG. 13A illustrates a checkout user interface web page 1300 in which a color of the product is selected, the subsequently served web page 1310 of FIG. 13B in which a type 1312 is selected, and the web page 1320 of FIG. 13C in which a size 1322 is selected. Then, a user may proceed to configure purchase options, such as shipping method 1402 and 1500, viewing sales tax 1404, and obtaining an order total 1406, as illustrated in the user interfaces 1400 and 1500 of FIGS. 14 and 15, respectively. Furthermore, payment information can be collected from the exemplary user interfaces 1600, 1610, and 1620 of FIG. 16A-16C, and a request to complete the transaction initiated upon by selection 1622 by a user. In embodiments, the user may also be given the option to save customer profile information 1612 which can be remembered in future transactions originating from the same third party system/application. Finally, the successful purchase may be acknowledged 1632 in another user interface web page 1630, as illustrated in FIG. 16D, and purchase details confirmed 1640, as illustrated in FIG. 16E.

The series of product checkout user interface web pages, generated and served by the commerce platform (processing block 412) and displayed within third party application (processing block 414) enable a user to interact with a product purchase workflow (processing block 416). Furthermore, the user interacts directly with the commerce platform via the optimized product checkout user interface web pages, even though it appears they are interacting with the third party application. Beneficially, the user is able to complete a transaction, from start to finish, with the commerce platform handling all financial information, and collecting all financial data, to allow third party application to avoid touching such data. Furthermore, development efforts of third parties are significantly reduced by not requiring the third party application to develop, test, and implement a commerce interface to one or more different merchants. Additionally, by having commerce platform generate product checkout user interface web pages, store the various data (e.g., merchant product feeds, third party account details, and customer profile data), perform transaction processing, etc., the performance of the third party application and the user device executing the application can be is improved by freeing memory and processing resource usage from these tasks now being handled by the commerce platform.

After an item has been appropriately configured within the product checkout user interface web pages rendered within third party application, third party application receives user selection to complete purchase of the product (processing block 418), and closes the web view within the third party application (processing block 424), thereby removing the web view from the user interface of the third party application. Processing logic of the commerce platform utilizes user financial information, as entered within the product checkout user interfaces to process the transaction with a merchant system offering the product (processing block 420). This can include verifying payment information, collecting payment, verifying with the merchant system the availability of a product, submitting an order with the merchant system, etc. Once verification is complete, the commerce system may provide attribution to the third party system (processing block 422).

Figure 5:
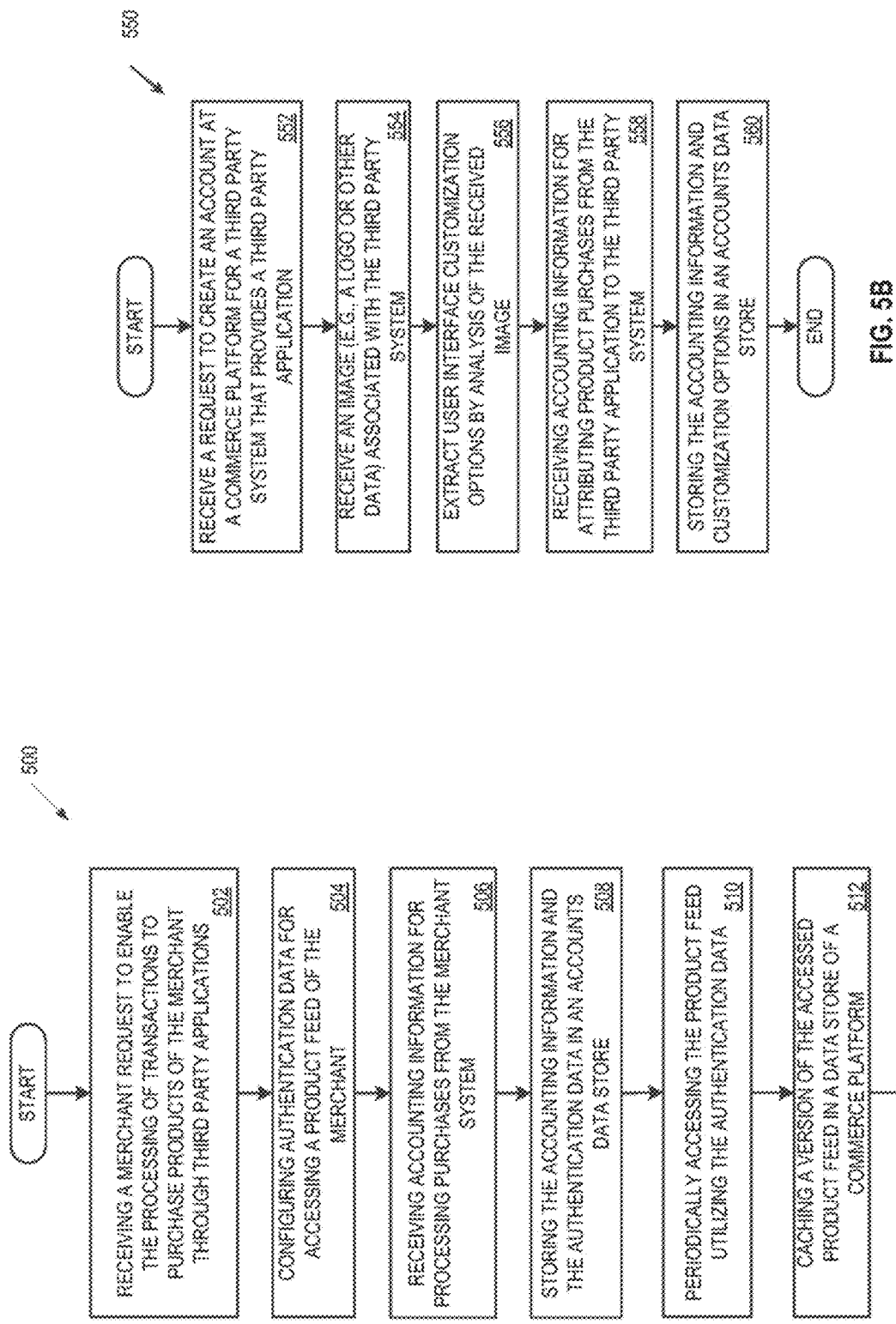
FIG. 5A is a flow diagram of one embodiment of a method for establishing a merchant account with a commerce platform that facilitates transactions for purchases from a merchant through a third party application.
FIG. 5B is a flow diagram of one embodiment of a method for establishing a third party system account with a commerce platform that facilitates transactions for purchases from a merchant through a third party application provided by the third party system.

FIG. 5A is a flow diagram of one embodiment of a method for establishing a merchant account with a commerce platform that facilitates transactions for purchases from a merchant through a third party application. The method 500 is performed by processing logic that may comprise hardware (circuitry, dedicated logic, etc.), software (such as is run on a general purpose computer system or a dedicated machine), firmware, or a combination thereof. In one embodiment, the method 500 is performed by a commerce platform (e.g., commerce platform 110 or 210).

Referring to FIG. 5A, processing logic begins by receiving a merchant request to enable processing of transactions to purchase products of the merchant through third party applications (processing block 502). For example, a merchant system requests to establish a relationship with the commerce platform to enable commerce platform to provide their products within product checkout user interfaces, as discussed herein.

Processing logic then configures authentication data for accessing a product feed of the merchant (processing block 504). In one embodiment, the authentication data may include one or more of a username/password combination, encryption keys, hash values, or other authentication data. Processing logic further receives account information for processing purchases from the merchant system (processing block 506). The account information can include information such as affiliated financial institutions, accepted payment methods, tax implications for purchases, etc. Processing logic stores the account information and the authentication data in an accounts data store (processing block 508). This information may be encrypted within the data store by processing logic due to the sensitive nature of some of this data.

Processing logic then periodically accesses the product feed utilizing the authentication data (processing block 510). The product feed, as discussed herein, is data indicative of products that are for sale by a merchant system. The data may include such information as stock information, SKUs of available items, images of items, product descriptions, etc. The accessed information is then cached in a data store of the commerce platform (processing block 512). As discussed herein, the cached product data may then be used to provide user interfaces for purchasing the products within third party applications.

FIG. 5B is a flow diagram of one embodiment of a method for establishing a third party system account with a commerce platform that facilitates transactions for purchases from a merchant through a third party application provided by the third party system. The method 550 is performed by processing logic that may comprise hardware (circuitry, dedicated logic, etc.), software (such as is run on a general purpose computer system or a dedicated machine), firmware, or a combination thereof. In one embodiment, the method 550 is performed by a commerce platform (e.g., commerce platform 110 or 210).

Referring to FIG. 5B, processing logic begins by receiving a request to create an account at a commerce platform for a third party system that provides a third party application (processing block 552). As discussed herein, the third party application may be a mobile application, such as a microblogging, social media, gaming, etc. application, execute on a mobile device such as a smartphone, tablet computer, etc.

Processing logic receives an image (e.g., a logo or other data) associated with the third party system (processing block 554). In another embodiment, other data, such as a link to a web page of the third party system, an XML file that defines fonts, color schemes, and user interface layouts, as well as other user third party branding information may be received in addition to the logo, as well as in place of the logo. However, in embodiments, processing logic extracts user interface customization options by analysis of the received image (processing block 556), such as utilizing image analysis techniques to extract significant colors, determining fonts, etc., which are later used in generating and providing optimized product checkout user interface web pages to third party applications.

Processing logic also receives accounting information for attributing product purchases from the third party application to the third party system (processing block 558). Similar to the discussion above, this information can include financial institution information, attribution preferences, payment methods, etc.

Processing logic stores the accounting information and customization options in an accounts data store (processing block 560). Again, such information may be stored in encrypted form to protect the potentially sensitive nature of the information being stored.

Figure 6:
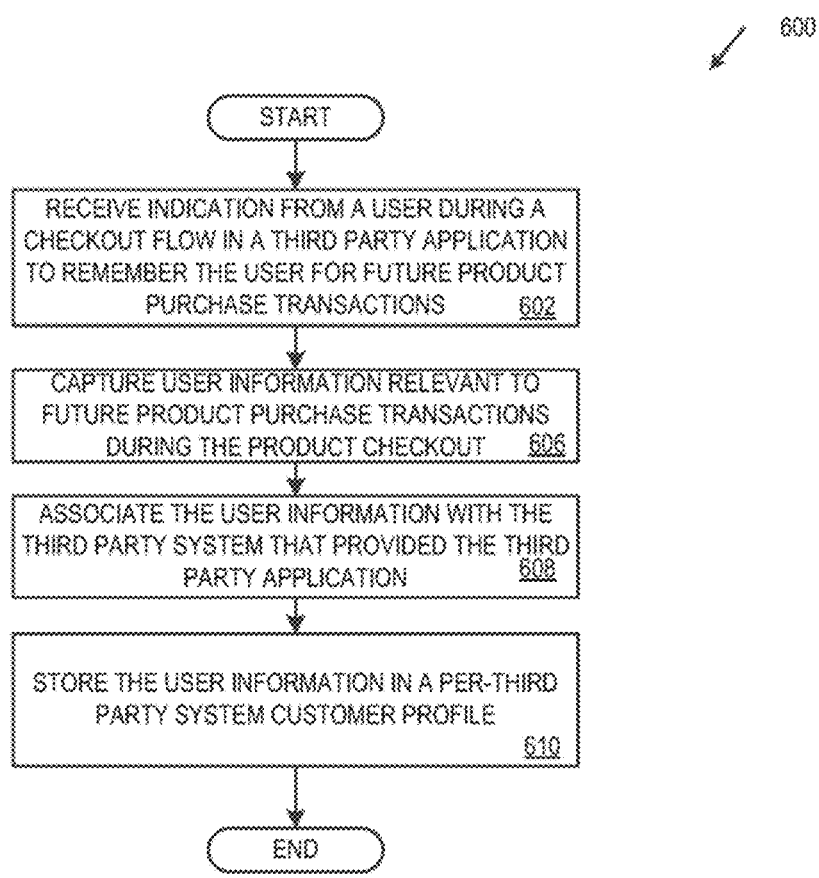
FIG. 6 is one embodiment of a method for establishing different user accounts for different third party systems that utilize a commerce platform to sell merchant products.

FIG. 6 is one embodiment of a method for establishing different user accounts for different third party systems that utilize a commerce platform to sell merchant products. The method 600 is performed by processing logic that may comprise hardware (circuitry, dedicated logic, etc.), software (such as is run on a general purpose computer system or a dedicated machine), firmware, or a combination thereof. In one embodiment, the method 600 is performed by a commerce platform (e.g., commerce platform 110 or 210).

Referring to FIG. 6, processing logic begins by receiving an indication from a user during a checkout flow in a third party application to remember the user for future product purchase transactions (processing block 602). As discussed herein, a customer profile data store may be maintained at the commerce platform, and user information (e.g., name, contact details, payment details, etc.) maintained for future use, in response to receipt of permission of the user. When permission is given, the user information relevant to future product purchase transactions is captured during product checkout (processing block 606). In one embodiment, the user information is captured from user inputted information into one or more fields of product checkout user interface web pages generated and served to a third party application based on further requests entered into those web pages.

Processing logic associates the user information with the third party that provided the third party application (processing block 608), and stores the user information in a per-third party system customer profile (processing block 610). For example, multiple customer profiles are maintained for the same user, where each customer profile corresponds with a specific third party system. Although this information is stored by the commerce platform, and would be available to future transactions, the information is not shared between third party systems so that each third party system appears to have independently remembered the customer profile data. This provides for a product checkout experience that appears to be directly between the third party system and a customer, but in fact utilizes the commerce platform as discussed herein.

Figure 7:
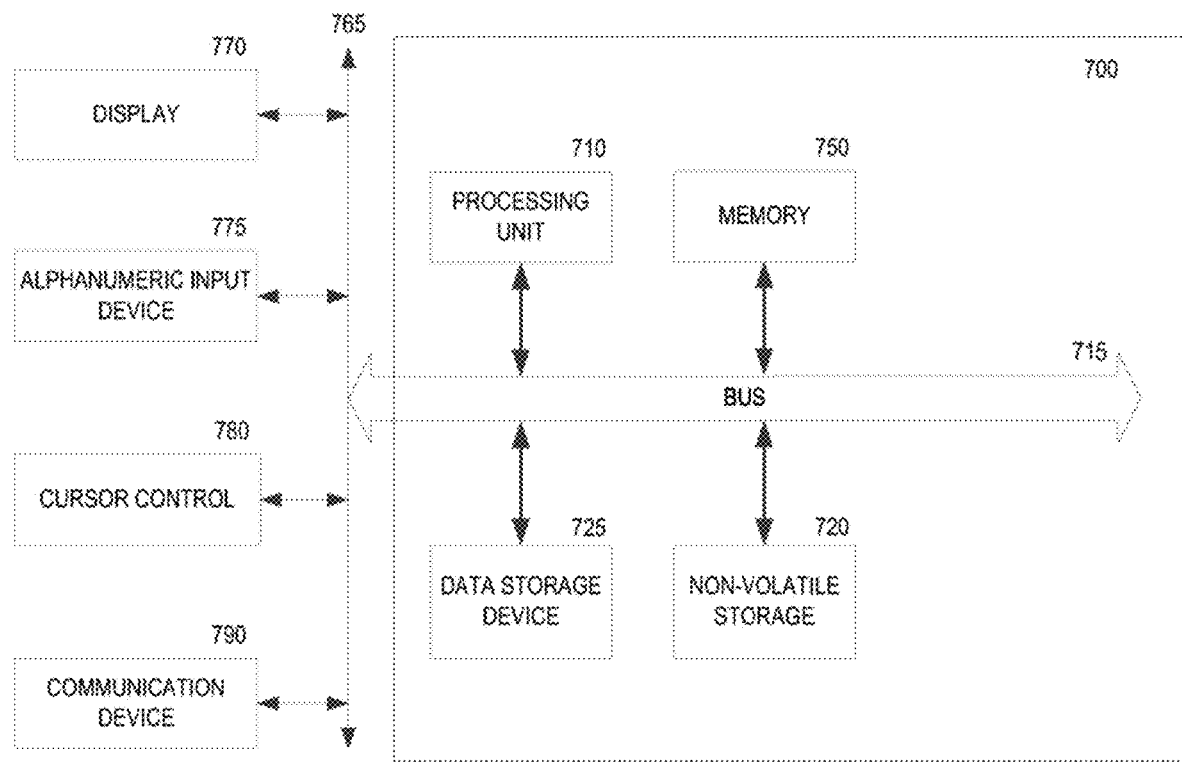
FIG. 7 is one embodiment of a computer system that may be used to support the systems and operations discussed herein.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 650 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 610, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

Figure 8:
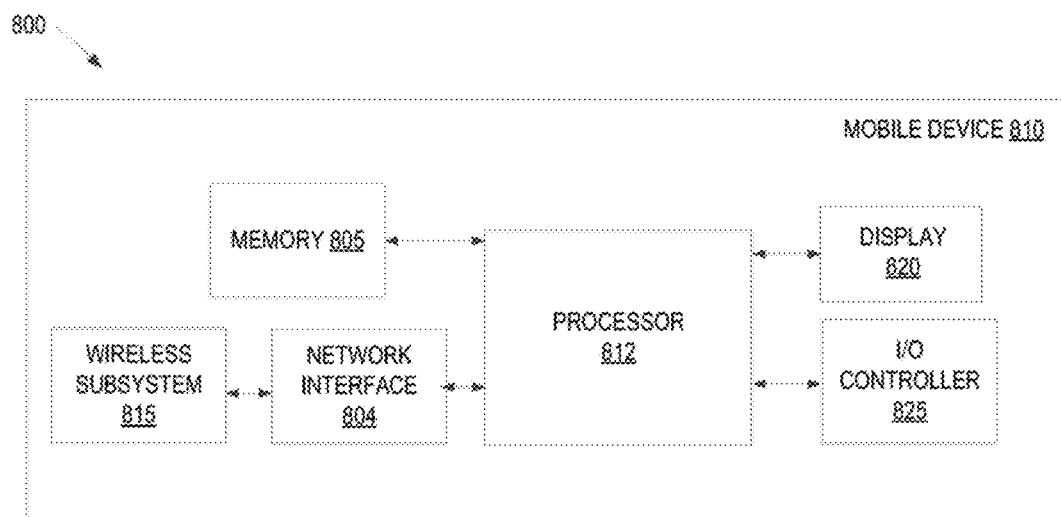
FIG. 8 is one embodiment of a mobile device that may be used to support the systems and operations discussed herein.

FIG. 8 is block diagram of one embodiment 800 of a mobile device. Mobile device 810 provides additional details for the user devices discussed above in FIGS. 1 and 2.

In one embodiment, mobile device 810 is a system, which may include one or more processors 812, a memory 805, I/O controller 825, network interface 804, and display 820. Mobile device 810 may also include a number of processing modules, which may be implemented as hardware, software, firmware, or a combination thereof. It should be appreciated that mobile device 810 may also include, although not illustrated, a user interface (e.g., keyboard, touch-screen, or similar devices), a power device (e.g., a battery), as well as other components typically associated with electronic devices. Network interface 804 may also be coupled to a number of wireless subsystems 815 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 804 and wireless subsystem 815 couple mobile device 810 to a network.

Memory 805 may be coupled to processor 812 to store instructions for execution by processor 812. In some embodiments, memory 805 is non-transitory. It should be appreciated that embodiments as described herein may be implemented through the execution of instructions, for example as stored in the memory 805 or other element, by processor 812 of mobile device 810 and/or other circuitry of mobile device 810 and/or other devices. Particularly, circuitry of mobile device 810, including but not limited to processor 812, may operate under the control of a program, routine, or the execution of instructions to execute methods or processes in accordance with the embodiments described herein. For example, such a program may be implemented in firmware or software (e.g. stored in memory 805 and/or other locations) and may be implemented by processors, such as processor 812, and/or other circuitry of mobile device 810. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 810 itself and/or some or all of the functions, engines or modules described herein may be performed by another system connected through I/O controller 825 or network interface 804 (wirelessly or wired) to mobile device 810. Thus, some and/or all of the functions may be performed by another system and the results or intermediate calculations may be transferred back to mobile device 810. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments.

However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for a commerce platform processing a transaction within a third party application for coordinating a purchase of a product sold by a merchant system through the third party application comprising:
   receiving, by a communication device of the commerce platform, a notification from the third party application requesting to purchase a product from within the third party application, wherein the notification comprises an identifier for the product and an identifier for the merchant system that sells the product;
   generating, by a processor of the commerce platform, a product checkout interface for purchase of the product, the generated product checkout interface having an appearance consistent with an appearance of a user interface of the third party application, wherein the product checkout interface is generated based at least in part on the identifier for the product, the identifier for the merchant system, and branding information associated with a third party that provided the third party application to a user device;
   transmitting, by the communication device of the commerce platform, the product checkout interface to the user device executing the third party application causing the third party application to render the product checkout interface within at least a portion of the user interface of the third party application; receiving, by the communication device of the commerce platform from the product checkout interface rendered by the user device, user identification data associated by the commerce platform with the third party application; and generating and transmitting, by the communication device of the commerce platform, an updated product checkout interface to the user device executing the third party application, the updated product checkout interface having one or more options associated with the purchase of the product automatically entered based on customer profile data.

2. The method of claim 1, further comprising:
   processing, by the processor of the commerce platform, a purchase of the product from the merchant system for the user device through the updated product checkout interface within the third party application based at least in part on the customer profile data.

3. The method of claim 1, wherein prior to receiving the notification, the method further comprises:
   processing a purchase of a second product from a second merchant for a user of the user device through a second product checkout interface within the third party application; and
   storing the customer profile data collected from the user during the purchase of the second product, wherein the customer profile data is stored in a customer profile data store of the commerce platform and associated with the third party that provides the third party application, and wherein the customer profile data comprises one or more of: a user name, user contact information, a shipping address, and user financial data.

4. The method of claim 3, wherein separate user financial data records are maintained in the customer profile data store of the commerce platform for different third parties that sells products of one or more of the merchant and the second merchant through the commerce platform.

5. The method of claim 3, further comprising:
   determining, by the commerce platform, that the user identification data is associated with the third party that provides the third party application;
   accessing the customer profile data based on the user identification data;
   automatically entering the customer profile data within the updated product checkout interface; and
   utilizing the automatically entered customer profile data to complete the purchase of the different product.

6. The method of claim 1, wherein the user device is a mobile device that renders the third party application and the checkout interface, and wherein the commerce platform selectively controls the display of one or more pages of the checkout interface at the mobile device in response to one or more corresponding requests of the user.

7. The method of claim 1, wherein the processing of the purchase of the product further comprises:
   generating and transmitting a series of product checkout interfaces to the third party application, each of the series of product checkout interfaces based at least in part on the branding information, wherein the series of product checkout interfaces comprise one or more interfaces that enable the user of the third party application to configure one or more characteristics associated with the product being purchased.

8. The method of claim 7, wherein the series of product checkout interfaces further comprise an interface to receive user information, an interface to receive payment information, an interface to confirm the transaction, an interface to render an updated price based on one or more user selected configuration options, an interface to render a total price associated with a transaction, an interface to display a purchase confirmation, or a combination thereof.

9. The method of claim 7, further comprising:
   receiving, at the commerce platform, user selection of one or more options within at least one of the series of product checkout interfaces to configure the one or more characteristics associated with the product being purchased; and
   based at least in part on the user selection of the one or more options: generating an update to the at least one of the series of product checkout interfaces, or transitioning to a next product checkout interface within the series of product checkout interfaces based on a product checkout work flow.

10. The method of claim 9, wherein the user selection of the one or more options comprises one or more of a user selection of a product size, a product color, a shipping method, and a payment method.

11. The method of claim 9, wherein the generated update to the at least one of the series of product checkout interfaces comprises an updated product checkout interface comprising a merchant system stock status of a selected product that has been configured based on the user selection of the one or more options.

12. The method of claim 1, further comprising:
   processing, by the commerce platform, the transaction to complete the purchase of the product from the merchant system through the updated product checkout interface generated by the commerce platform and rendered within at least a portion of the user interface of the third party application, wherein the processing of the transaction through the updated product checkout interface is performed by the commerce platform to restrict the third party application from accessing financial information of a user received from the user device during the transaction.

13. The method of claim 12, further comprising:
providing remuneration, by the commerce platform, to the third party that provides the third party application after the purchase of the product from the merchant has been processed.

14. The method of claim 12, wherein processing the transaction further comprises:
generating an order for the product at the commerce platform;
transmitting the order from the commerce to the merchant system for acceptance by the merchant system of the purchase of the product;
receiving a confirmation at the commerce platform that the order has been accepted by the merchant system; and
generating a user interface by the commerce platform that is displayed within the third party application and includes data indicative of a successful purchase of the product from the merchant system through the third party application.

15. The method of claim 1, wherein the notification is received in response to user selection of a link to the commerce platform within the third party application, and wherein the product checkout interface is a web page generated by the commerce platform in response to user selection of the link and displayed within at least a portion of the third party application.

16. A non-transitory computer readable storage medium including instructions that, when executed by a processor, cause the processor to perform a method for a commerce platform processing a transaction within a third party application for coordinating a purchase of a product sold by a merchant system through the third party application, the method comprising:
receiving, by a communication device of the commerce platform, a notification from the third party application requesting to purchase a product from within the third party application, wherein the notification comprises an identifier for the product and an identifier for the merchant system that sells the product;
generating, by a processor of the commerce platform, a product checkout interface for purchase of the product, the generated product checkout interface having an appearance consistent with an appearance of a user interface of the third party application, wherein the product checkout interface is generated based at least in part on the identifier for the product, the identifier for the merchant system, and branding information associated with a third party that provided the third party application to a user device;
transmitting, by the communication device of the commerce platform, the product checkout interface to the user device executing the third party application causing the third party application to render the product checkout interface within at least a portion of the user interface of the third party application;
receiving, by the communication device of the commerce platform from the product checkout interface rendered by the user device, user identification data associated by the commerce platform with the third party application; and
generating and transmitting, by the communication device of the commerce platform, an updated product checkout interface to the user device executing the third party application, the updated product checkout interface having one or more options associated with the purchase of the product automatically entered based on customer profile data.

17. The non-transitory computer readable storage medium of claim 16, further comprising:
processing, by the processor of the commerce platform, a purchase of the product from the merchant system for the user device through the updated product checkout interface within the third party application based at least in part on the customer profile data.

18. The non-transitory computer readable storage medium of claim 16, wherein prior to receiving the notification, the method further comprises:
processing a purchase of a second product from a second merchant for a user of the user device through a second product checkout interface within the third party application; and
storing the customer profile data collected from the user during the purchase of the second product, wherein the customer profile data is stored in a customer profile data store of the commerce platform and associated with the third party that provides the third party application, and wherein the customer profile data comprises one or more of: a user name, user contact information, a shipping address, and user financial data.

19. The non-transitory computer readable storage medium of claim 18, wherein separate user financial data records are maintained in the customer profile data store of the commerce platform for different third parties that sells products of one or more of the merchant and the second merchant through the commerce platform.

20. A commerce platform that processes a transaction within a third party application for purchase of a product sold by a merchant system through the third party application, the commerce platform comprising:
a memory that stores data indicative of products of the merchant available for purchase through the third party application; and
a processor coupled with the memory configured to:
receive a notification from the third party application requesting to purchase a product from within the third party application, wherein the notification comprises an identifier for the product and an identifier for the merchant system that sells the product;
generate a product checkout interface for purchase of the product, the generated product checkout interface having an appearance consistent with an appearance of a user interface of the third party application, wherein the product checkout interface is generated based at least in part on the identifier for the product, the identifier for the merchant system, and branding information associated with a third party that provided the third party application to a user device,
transmit the product checkout interface to the user device executing the third party application causing the third party application to render the product checkout interface within at least a portion of the user interface of the third party application,
receiving, from the product checkout interface rendered by the user device, user identification data associated by the commerce platform with the third party application, and generate and transmitting an updated product checkout interface to the user device executing the third party application, the updated product checkout interface having one or more options associated with the purchase of the product automatically entered based on customer profile data.

21. The commerce platform of claim 20, wherein the processor is further configured to:

process a purchase of the product from the merchant system for the user device through the updated product checkout interface within the third party application based at least in part on the customer profile data.

22. The commerce platform of claim 20, wherein the processor, prior to receiving the notification, is further configured to:

process a purchase of a second product from a second merchant for a user of the user device through a second product checkout interface within the third party application; and store the customer profile data collected from the user during the purchase of the second product, wherein the customer profile data is stored in a customer profile data store of the commerce platform and associated with the third party that provides the third party application, and wherein the customer profile data comprises one or more of: a user name, user contact information, a shipping address, and user financial data.

23. The commerce platform of claim 22, wherein separate user financial data records are maintained in the customer profile data store of the commerce platform for different third parties that sells products of one or more of the merchant and the second merchant through the commerce platform.

* * * * *